(12) United States Patent
Zhao et al.

(10) Patent No.: US 12,497,564 B2
(45) Date of Patent: Dec. 16, 2025

(54) LIQUID CRYSTAL COMPOSITION AND LIQUID CRYSTAL DISPLAY DEVICE THEREOF

(71) Applicant: Jiangsu Hecheng Display Technology Co., Ltd., Nanjing (CN)

(72) Inventors: Tengyun Zhao, Nanjing (CN); Yafei Yang, Nanjing (CN); Wenquan Ding, Nanjing (CN); Di He, Nanjing (CN); Panpan Wang, Nanjing (CN); Shuang Xu, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 4 days.

(21) Appl. No.: 18/553,764

(22) PCT Filed: Apr. 8, 2022

(86) PCT No.: PCT/CN2022/085767
§ 371 (c)(1),
(2) Date: Oct. 3, 2023

(87) PCT Pub. No.: WO2022/218217
PCT Pub. Date: Oct. 20, 2022

(65) Prior Publication Data
US 2024/0228879 A1     Jul. 11, 2024

(30) Foreign Application Priority Data

Apr. 15, 2021   (CN) .................. 202110406533.X

(51) Int. Cl.
*G02F 1/1333*   (2006.01)
*C09K 19/30*    (2006.01)
*C09K 19/34*    (2006.01)
*C09K 19/54*    (2006.01)
*C09K 19/56*    (2006.01)

(52) U.S. Cl.
CPC ...... *C09K 19/3491* (2013.01); *C09K 19/3066* (2013.01); *C09K 19/542* (2013.01); *C09K 19/56* (2013.01); *C09K 2019/548* (2013.01)

(58) Field of Classification Search
CPC ........ C09K 19/12; C09K 19/14; C09K 19/20; C09K 19/30; C09K 19/32; C09K 19/34; C09K 19/42; C09K 19/56; C09K 19/542; C09K 19/3491; C09K 19/3066; C09K 2019/548; C09K 2019/0466; C09K 2019/0448; C09K 2019/122; C09K 2019/123; C09K 2019/3004; C09K 2019/3009; C09K 2019/301; C09K 2019/3016; C09K 2019/3027; C09K 2019/3422; G02F 1/1333
See application file for complete search history.

(56) References Cited

U.S. PATENT DOCUMENTS

| | | | |
|---|---|---|---|
| 2017/0362506 A1* | 12/2017 | Hirschmann | ...... C09K 19/3003 |
| 2019/0078021 A1 | 3/2019 | Wang et al. | |
| 2019/0161679 A1 | 5/2019 | Hirschmann et al. | |
| 2019/0185752 A1 | 6/2019 | Wang et al. | |
| 2019/0256776 A1 | 8/2019 | Huang et al. | |
| 2019/0338187 A1 | 11/2019 | Manabe et al. | |
| 2019/0359889 A1 | 11/2019 | Mulcahy et al. | |
| 2019/0390112 A1 | 12/2019 | Hirschmann et al. | |

(Continued)

FOREIGN PATENT DOCUMENTS

| | | |
|---|---|---|
| CN | 109486500 A | 3/2019 |
| CN | 109790465 A | 5/2019 |

(Continued)

*Primary Examiner* — Geraldina Visconti
(74) *Attorney, Agent, or Firm* — Hoffmann & Baron, LLP

(57) ABSTRACT

A liquid crystal composition includes at least one compound represented by formula I and at least one compound represented by formula II. The liquid crystal composition has a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, while maintaining appropriate clearing points, optical anisotropy and rotational viscosity. A liquid crystal display device containing the liquid crystal composition has a relatively wide temperature usage range, relatively good contrast, and relatively good low-temperature mutual solubility. In addition, the production process of PSA-type liquid crystal displays is improved, and at the same time, the problems of "image sticking", uneven display and "broken bright spots".

formula I

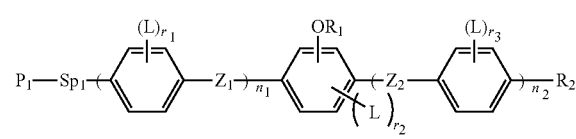

formula II

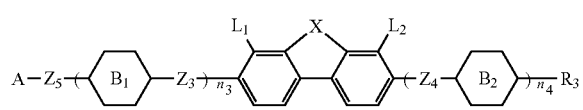

5 Claims, No Drawings

(56) References Cited

U.S. PATENT DOCUMENTS

| | | | |
|---|---|---|---|
| 2020/0032143 A1 | 1/2020 | Takata | |
| 2020/0239776 A1 | 7/2020 | Kang et al. | |
| 2020/0239778 A1* | 7/2020 | Kang | C09K 19/3405 |
| 2021/0032539 A1 | 2/2021 | Hatanaka et al. | |
| 2024/0228879 A1* | 7/2024 | Zhao | C09K 19/56 |

FOREIGN PATENT DOCUMENTS

| | | | | |
|---|---|---|---|---|
| CN | 109837096 A | 6/2019 | | |
| CN | 109913238 A | 6/2019 | | |
| CN | 109943347 A | 6/2019 | | |
| CN | 110023457 A | 7/2019 | | |
| CN | 110300746 A | 10/2019 | | |
| CN | 110499162 A | 11/2019 | | |
| CN | 110831931 A | 2/2020 | | |
| CN | 111484856 A | 8/2020 | | |
| CN | 111484858 A | 8/2020 | | |
| CN | 111592517 A * | 8/2020 | | C09K 19/3405 |
| CN | 111592890 A * | 8/2020 | | C09K 19/3491 |
| CN | 111732569 A | 10/2020 | | |
| CN | 111747853 A | 10/2020 | | |
| CN | 112029512 A | 12/2020 | | |
| CN | 112538358 A | 3/2021 | | |
| CN | 113881443 A | 1/2022 | | |
| CN | 114214075 A | 3/2022 | | |
| DE | 102018009037 A | 5/2019 | | |
| JP | 2019-116611 A | 7/2019 | | |
| JP | 2019-147859 A | 9/2019 | | |
| JP | 2020-52305 A | 4/2020 | | |
| JP | 2021-28299 A | 2/2021 | | |
| TW | 201925435 A | 7/2019 | | |
| TW | 202045687 A | 12/2020 | | |
| TW | 202111098 A | 3/2021 | | |
| WO | 2018/180850 A1 | 10/2018 | | |
| WO | 2019/124095 A1 | 6/2019 | | |

* cited by examiner

LIQUID CRYSTAL COMPOSITION AND LIQUID CRYSTAL DISPLAY DEVICE THEREOF

CROSS-REFERENCE TO RELATED APPLICATIONS

This application is the National Stage of International Application No. PCT/CN2022/085767, filed Apr. 8, 2022, which claims the benefit of Chinese Application No. 202110406533.X, filed, the contents of which is incorporated by reference herein.

TECHNICAL FIELD

The present invention relates to the field of liquid crystal, specifically to a liquid crystal composition and a liquid crystal display device comprising the liquid crystal composition.

BACKGROUND ARTS

Liquid crystal displays (LCDs) have gained rapid development due to their small size, light weight, low power consumption and excellent display quality, and in particular, have been widely used in portable electronic information products. Based on the displaying mode, liquid crystal displays can be classified into the types of PC (phase change), TN (twisted nematic), STN (super twisted nematic), ECB (electrically controlled birefringence), OCB (optically compensated bend), IPS (in-plane switching), FFS (fringe field switching), VA (vertical alignment), PSA (polymer stable alignment), and the like.

A PSA-type liquid crystal display device is manufactured by adding a small amount (typically, <1 wt. %, such as 0.3 wt. %) of one or more polymerizable compounds into a liquid crystal composition, ensuring that after the liquid crystal composition is filled into a liquid crystal cell, and polymerizing, usually via a UV photopolymerization, or crosslinking the polymerizable compounds in situ under a condition where liquid crystal molecules are initially aligned with or without a voltage applied between electrodes, thereby fixing the alignment of the liquid crystal molecules. With the continuous development of PSA-type liquid crystal display device, it is used in diverse classical liquid crystal displays, such as the known PSA-VA, PSA-OCB, PSA-IPS, PSA-FFS, and PSA-TN displays. In a PSA liquid crystal display, the liquid crystal composition containing the polymerizable compound(s) is positioned between two substrates. Each substrate is equipped with an electrode structure, or alternatively two electrode structures are provided on only one of the substrates. In addition, one or both substrates may contain an alignment layer which is provided on the substrate or the electrode structure (if present), to induce initial alignment of the liquid crystal composition. Like the conventional liquid crystal displays, PSA liquid crystal displays can be operated as active-matrix displays or passive-matrix displays. In the case of active-matrix displays, individual pixels are addressed by integrated, non-linear active elements, such as transistors, while in the case of passive-matrix displays, individual pixels are usually addressed by the multiplex method, as known from the prior art.

After filling the liquid crystal composition into the display device, the polymerizable compounds contained in the liquid crystal composition are polymerized or crosslinked in situ, usually by UV photopolymerization, which is achieved by exposing the liquid crystal composition to UV radiation, preferably while a voltage is applied to the electrode structures. As a result of UV exposure, the polymerized or crosslinked polymerizable compounds phase-separate from other compounds in the liquid crystal composition and form a polymer layer on the substrate surfaces, where they induce a pre-tilt angle of the liquid crystal molecules relative to the substrates. Polymerization of the polymerizable compounds preferably takes place with an applied voltage in case of PSA-VA, PSA-OCB, PSA-FFS and PSA-TN liquid crystal displays, and with or without, preferably without, an applied voltage in case of PSA-IPS liquid crystal displays.

Usually UV photopolymerization in the PSA liquid crystal display production process is carried out through the following two steps.

In a first step, hereinafter also referred to as "UV1 step", the liquid crystal composition is exposed to UV radiation emitted by a radiation source (hereinafter also referred to as "light source"), while applying a voltage to the electrode structures, to generate a pre-tilt angle. A more preferred polymerizable compound should generate a smaller pre-tilt angle within the same time or a same pre-tilt angle within a shorter UV1 radiation time (i.e., a faster speed for forming pre-tilt angle), in order to improve production efficiency, shorten the tact time during batch production, and reduce costs. At the same time, the faster the speed for forming pre-tilt angle of the polymerizable compounds, the more favorable it is for the polymerizable compounds to achieve complete polymerization and thereby reduce polymer residue. In order to improve the speed for forming pre-tilt angle, shorter wavelength UV1 radiation is preferred, while in order to improve the voltage holding ratio (VHR), longer wavelength UV1 radiation is preferred. Therefore, it is usually difficult to balance a faster speed for forming pre-tilt angle with a higher voltage holding ratio;

In a second step, hereinafter also referred to as "UV2 step", the liquid crystal composition is exposed to UV radiation without a voltage, in order to ensure complete polymerization of any residual polymerizable compounds that did not polymerize in UV1 step. It is expected that after the UV2 step, the change in pre-tilt angle should be minimized as much as possible to reduce the possibility of display unevenness in PSA type liquid crystal displays due to uneven conditions of the UV process (uneven external conditions such as light, heat, stress and the like). At the same time, the UV radiation intensity in the UV2 step should be reduced to avoid or reduce negative effects such as reduced reliability or image stickiness.

If the phenomenon of polymer particles being too large or uneven in size occurs in the process of UV1 and UV2, it will lead to uneven distribution of polymers, thereby leading to the problem of "broken bright spots" in PSA type liquid crystal displays. After the process of UV1 and UV2, polymerizable compounds that have not yet reacted may polymerize in an uncontrollable manner after the display is manufactured, thereby affect the quality of the image display. For example, residual polymerizable compounds may polymerize under the influence of UV light from the environment or backlight illumination. In the addressed display areas, this changes the pre-tilt angle after a number of addressing cycles. As a result, a change in transmission in the addressed areas may occur, while the pre-tilt angle and transmission remain unchanged in the non-addressed display areas, thus causing "image sticking" effect.

However, in the application of existing technology, it has been found that not all liquid crystal compositions can be perfectly matched with polymerizable compounds. After UV1 and UV2 treatments, residual polymerizable compounds may not be fully polymerized, or the speed of pre-tilt angle formation may be slow. At the same time, the poor intersolubility between the liquid crystal composition and the polymerizable compound can lead to poor rigidity of the polymer network formed by the polymerization of the polymerizable compound, resulting in changes in the structure of the polymer network when the PSA type liquid crystal display device continuously displays the same pattern for a long time, which in turn leads to changes in the pre-tilt angle of the liquid crystal molecules, and poor display.

However, with the development of technology, the liquid crystal display industry has more stringent requirements for the display quality of liquid crystal display, especially in the TV industry, with the general increase of the size of TVs, the LCD generation line has been increased. The difficulty of manufacturing the large-size LCD panels has also been significantly increased. Therefore, how to ensure the display quality is an urgent problem to be solved. In addition to continuously optimizing the panel manufacturing process, the continuous development of liquid crystal materials is also one of the solutions. Especially for PSA liquid crystal displays, the selection of liquid crystal compositions used in combination with polymerizable compounds has become a hot spot of the research.

Currently, common problems in the production of PSA liquid crystal displays comprise the presence and removal of residual amounts of unpolymerized compounds as well as the stability of pre-tilt angle. After the generation of the pre-tilt angle in PSA liquid crystal displays through polymerization of polymerizable compounds with UV1 and UV2 steps, a small amount of unreacted polymerizable compounds may adversely affect the properties of the display by polymerizing in an uncontrolled manner after the display has been manufactured. For example, polymerization of the residual polymerizable compounds is initiated by UV light from the environment or the backlight illumination. In the addressed display areas, this changes the pre-tilt angle after a number of addressing cycles. As a result, a change in transmission in the addressed areas may occur, while the pre-tilt angle and transmission remain unchanged in the non-addressed display areas, thus causing "image sticking" effect. During the production of the PSA liquid crystal display, it is therefore desirable that polymerization of the polymerizable compounds proceeds as completely as possible. In addition, a controlled reaction of the residual polymerizable compounds is desirable. These expectations are more conducive to be achieved if the polymerization rate is faster. In addition, it is also desirable that the change in pre-tilt angle is small after a plurality of addressing cycles.

In addition, the polymerizable compounds of prior art do often have high melting points, and do only show limited solubility in many commonly used liquid crystal compositions, and therefore frequently tend to spontaneously crystallize out of the liquid crystal compositions. In addition, the solubility of the polymerizable compound in liquid crystal compositions is further aggravated by the risk of spontaneous polymerization thereof. Therefore, the liquid crystal compositions in which polymerizable compounds are dissolved are usually introduced in the display at low temperatures in order to reduce the risk of spontaneous polymerization. This puts higher requirements on the solubility of the polymerizable compound in the liquid crystal composition, especially the solubility at low temperature.

Therefore, it is expected to develop a liquid crystal composition that can satisfy the above requirements simultaneously or at least one of the above requirements.

SUMMARY OF THE INVENTION

Objects

An object of the present invention is to provide a liquid crystal composition, the liquid crystal composition has a larger absolute value of dielectric anisotropy, a larger K value, a longer low-temperature storage time period, a lower polymer layer surface roughness, a smaller pre-tilt angle, a faster speed for forming pre-tilt angle, a lower polymer residue, a higher VHR, and a good pre-tilt angle stability, while maintaining an appropriate clearing point, an optical anisotropy and a rotational viscosity.

A further object of the present invention is to provide a liquid crystal display device comprising the above liquid crystal composition.

Technical Solutions

To realize the above invention objects, the present invention provides a liquid crystal composition containing polymerizable compound, the liquid crystal composition comprises:

at least one compound of general formula I:

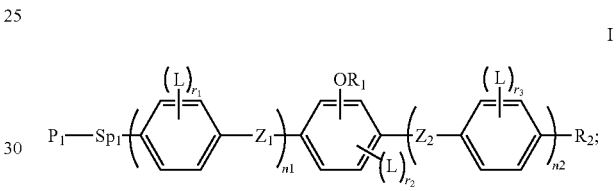

and
at least one compound of general formula II:

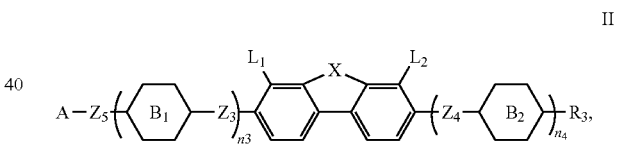

wherein,
$R_1$ represents $C_{1-5}$ linear or branched, halogenated or unhalogenated alkyl;
$R_2$ represents —H, halogen, —CN, -$Sp_2$-$P_2$ or $C_{1-12}$ linear or branched alkyl,

wherein one or more than two nonadjacent —$CH_2$— in the $C_{1-12}$ linear or branched alkyl,

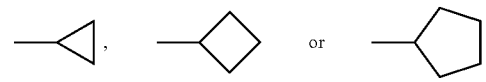

can each be independently replaced by —CH=CH—, —C≡C—, —O—, —CO—, —CO—O— or —O—CO—, one or more —H can each be independently substituted by —F or —Cl;

$R_3$ represents —H, halogen, $C_{1-12}$ linear or branched alkyl,

wherein one or more than two nonadjacent —$CH_2$— in the $C_{1-12}$ linear or branched alkyl can each be independently replaced by —CH=CH—, —C≡C—, —O—, —CO—, —CO—O— or —O—CO— in a manner that —O— are not directly connected to each other, and one or more —H on the $C_{1-12}$ linear or branched alkyl,

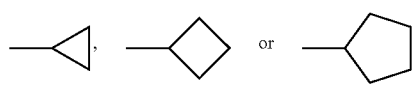

can each be independently substituted by —F or —Cl;
ring

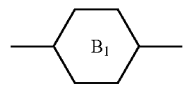

and ring

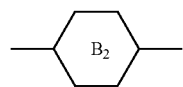

each independently represents

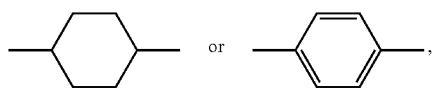

wherein one or more —$CH_2$— in

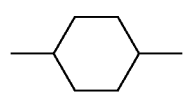

can be replaced by —O—, and one or more single bond in the ring can be replaced by double bond, wherein one or more —H on

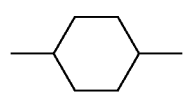

can each be independently substituted by —F, —Cl or —CN, and one or more —CH= in the ring can be replaced by —N=;

A represents

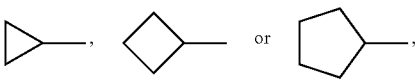

wherein one or more —$CH_2$— in

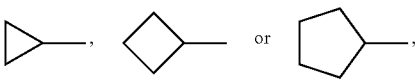

can each be independently replaced by $X^1$ or $X^2$, and one or more single bond in the ring can be replaced by double bond, wherein $X^1$ represents —O— or —S—, $X^2$ represents $C_{1-5}$ linear alkyl;

L each independently represents halogen, —CN or -$Sp_2$-$P_2$;

$L_1$ and $L_2$ each independently represents —H, halogen, $C_{1-3}$ halogenated alkyl or $C_{1-3}$ halogenated alkoxy;

$P_1$ and $P_2$ each independently represents polymerizable group;

$Sp_1$ and $Sp_2$ each independently represents spacer group or single bond;

X represents —O—, —S—, —CO—, —$CF_2$—, —NH— or —NF—;

$Z_1$ and $Z_2$ each independently represents —O—, —S—, —CO—, —CO—O—, —O—CO—, —O—CO—O—, —$CH_2$O—, —$OCH_2$—, —$CH_2$S—, —$SCH_2$—, —$CF_2$O—, —$OCF_2$—, —$CF_2$S—, —$SCF_2$—, —$(CH_2)_n$—, —$CF_2CH_2$—, —$CH_2CF_2$—, —$(CF_2)_n$—, —CH=CH—, —CF=CF—, —CH=CF—, —CF=CH—, —C≡C—, —CH=CH—CO—O—, —O—CO—CH=CH—, —$CH_2CH_2$—CO—O—, —O—CO—$CH_2CH_2$—, —$CR^1R^2$— or single bond; wherein, $R^1$ and $R^2$ each independently represents —H or $C_{1-12}$ linear or branched alkyl, and n represents an integer of 1-4;

$Z_3$, $Z_4$ and $Z_5$ each independently represents single bond, —$CH_2CH_2$—, —$CF_2CF_2$—, —CO—O—, —O—CO—, —O—CO—O—, —CH=CH—, —CF=CF—, —$CH_2$O— or —$OCH_2$—;

$r_1$, $r_2$ and $r_3$ each independently represents 0, 1, 2 or 3, when $r_1$, $r_2$ and $r_3$ each independently represents 2 or 3, L can be the same or different;

$n_1$ and $n_2$ each independently represents 0, 1 or 2, and $n_1+n_2 \geq 1$, when $n_1$ represents 2,

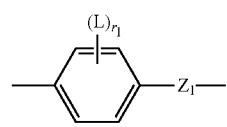

can be the same or different, when $n_2$ represents 2,

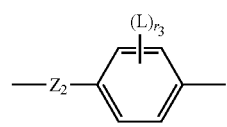

can be the same or different; and n₃ represents 0, 1 or 2, n₄ represents 0 or 1, when n₃ represents 2, ring

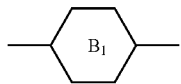

can be the same or different, $Z_3$ can be the same or different.

In some embodiments of the present invention, $R_1$ represents $C_{1-5}$ linear alkyl, for example —CH₃, —C₂H₅, —C₃H₇, —C₄H₉ or —C₅H₁₁.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, $R_1$ preferably represents —CH₃.

In some embodiments of the present invention, L each independently represents —F, —Cl, —CN or -Sp₂-P₂.

In some embodiments of the present invention, $r_1$ and $r_2$ each independently represents 0 or 1.

In some embodiments of the present invention, $Z_1$ and $Z_2$ each independently represents single bond.

In some embodiments of the present invention, $R_2$ represents -Sp₂-P₂.

In some embodiments of the present invention, the compound of general formula I is selected from a group consisting of the following compounds:

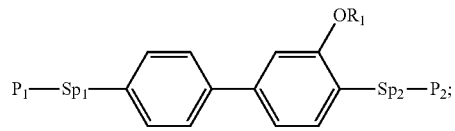
I-1

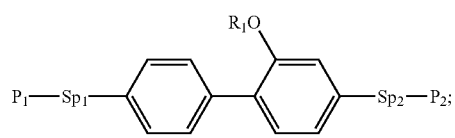
I-2

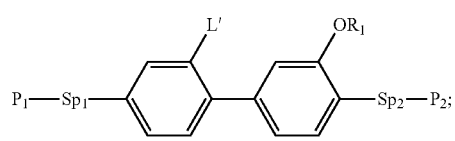
I-3

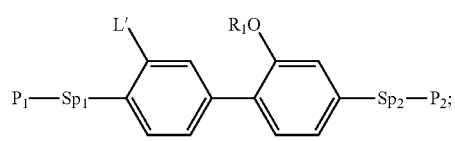
I-4

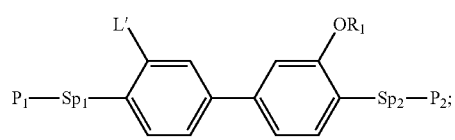
I-5

-continued

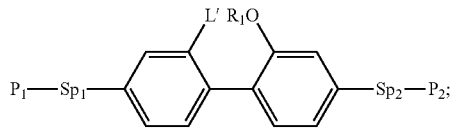
I-6

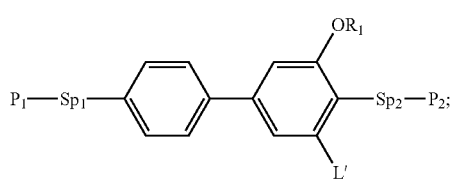
I-7

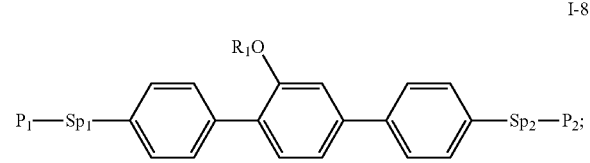
I-8

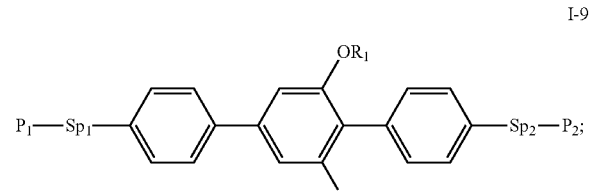
I-9

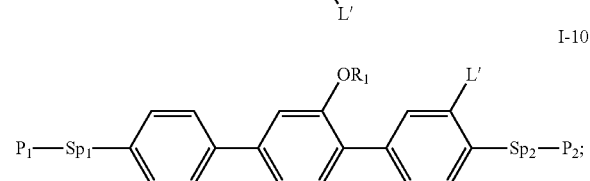
I-10

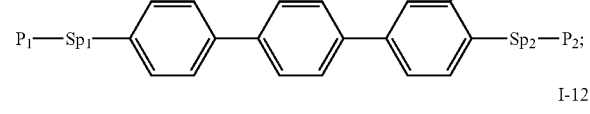
I-11

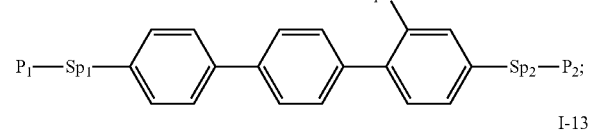
I-12

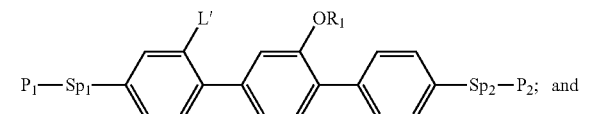
I-13

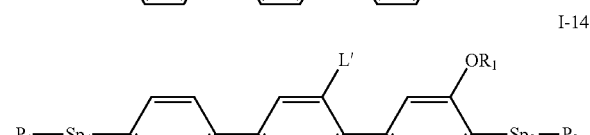
I-14

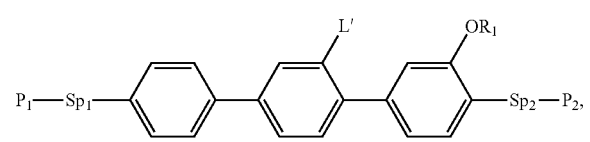

wherein,
L' and L" each independently represents —F, —Cl, —CN or -Sp₂-P₂.

In some embodiments of the present invention, the compound of general formula I is selected from a group consisting of the compound of general formula I-1, the compound of general formula I-2, the compound of general formula I-3, the compound of general formula I-4 and the compound of general formula I-8.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula I is selected from a group consisting of the compound of general formula I-1, the compound of general formula I-2, the compound of general formula I-4 and the compound of general formula I-8.

The polymerizable groups involved in the present invention are groups suitable for polymerization reactions (for example, radical or ionic bond polymerization, addition polymerization or condensation polymerization), or groups suitable for addition or condensation on the polymer backbone. For chain polymerization, a polymerizable group containing —CH═CH— or —C≡C— is particularly preferred, and for ring-opening polymerization, for example, an oxetane or epoxy group is particularly preferred.

The term "polymerizable group" each independently represents

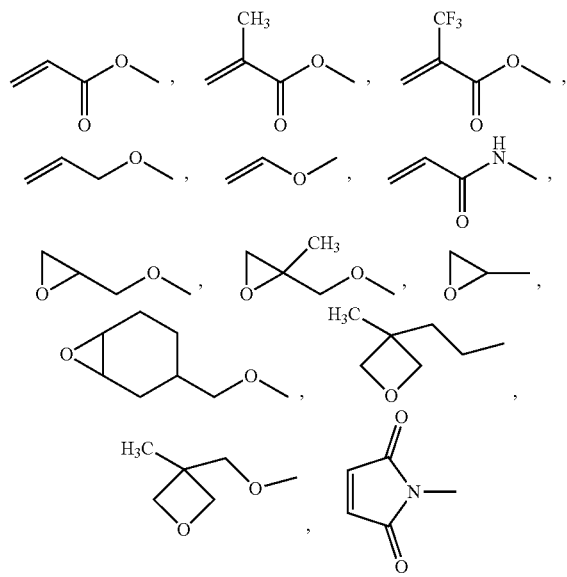

or —SH; preferably, "polymerizable group" each independently represents

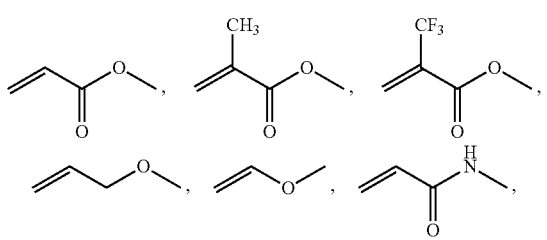

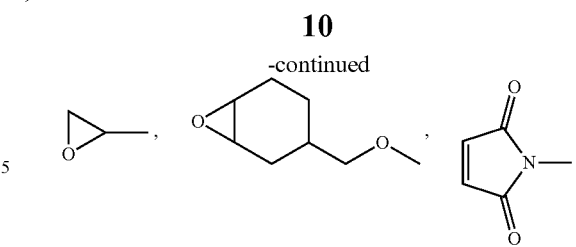

or —SH; more preferably, "polymerizable group" each independently represents

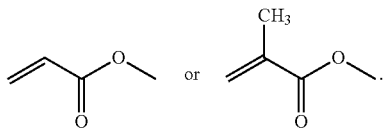

The term "spacer group" as used herein, is known to the person skilled in the art and is described in the literature, for example, Pure Appl. Chem. 2001, 73(5), 888 and C. Tschierske, G. Pelzl, S. Diele, Angew. Chem. 2004, 116, 6340-6368. As used herein, the term "spacer group" means a flexible group which connects the mesogenic group and the polymerizable group(s) in a polymerizable compound. Representative spacer group for example is —$(CH_2)_{p_1}$-, —$(CH_2CH_2O)_{q_1}$-$CH_2CH_2$—, —$(CH_2CH_2S)_{q_1}$-$CH_2CH_2$—, —$(CH_2CH_2NH)_{q_1}$-$CH_2CH_2$—, —$CR^{0}R^{00}$—$(CH_2)_{p_1}$— or —$(SiR^{0}R^{00}$—$O)_{p_1}$-, wherein $p_1$ represents an integer of 1-12 (for example, 1, 2, 3, 4, 5, 6, 7, 8, 9, 10, 11, etc.), $q_1$ represents an integer of 1-3 (for example, 2), $R^0$ and $R^{00}$ each independently represents —H or $C_{1-12}$ linear or branched alkyl,

The spacer group is preferably —$(CH_2)_{p_1}$-, —$(CH_2)_{p_1}$-O—, —$(CH_2)_{p_1}$-O—CO—, —$(CH_2)_{p_1}$-CO—O—, —$(CH_2)_{p_1}$-O—CO—O— or —$CR^{0}R^{00}$—$(CH_2)_{p_1}$—.

In some embodiments of the present invention, both $Sp_1$ and $Sp_2$ represent single bond.

In some embodiments of the present invention, the compound of general formula I provides (in percentage by weight) 0.001%~5% of the liquid crystal composition, for example, 0.005%, 0.01%, 0.05%, 0.1%, 0.15%, 0.2%, 0.25%, 0.3%, 0.35%, 0.4%, 0.45% and the like; preferably, the compound of general formula I provides (in percentage by weight) 0.01%~2% of the liquid crystal composition.

In the present invention, the representation method of a straight line passing through a ring structure represents the accessing bond of a group at any bonding position of the ring structure In some embodiments of the present invention, $L_1$ and $L_2$ each independently represents —F or —Cl.

In some embodiments of the present invention, both $L_1$ and $L_2$ represent —F.

In some embodiments of the present invention, X represents —O— or —S—.

In some embodiments of the present invention, preferably, $R_3$ represents $C_{1-10}$ linear or branched alkyl, $C_{1-9}$ linear or branched alkoxy or $C_{2-10}$ linear or branched alkenyl; further preferably, $R_3$ represents $C_{1-8}$ linear or branched alkyl, $C_{1-7}$ linear or branched alkoxy or $C_{2-8}$ linear or branched alkenyl; still further preferably, $R_3$ represents $C_{1-5}$ linear or branched alkyl, $C_{1-4}$ linear or branched alkoxy or $C_{2-5}$ linear or branched alkenyl.

In some embodiments of the present invention, the compound of general formula II is selected from a group consisting of the following compounds:

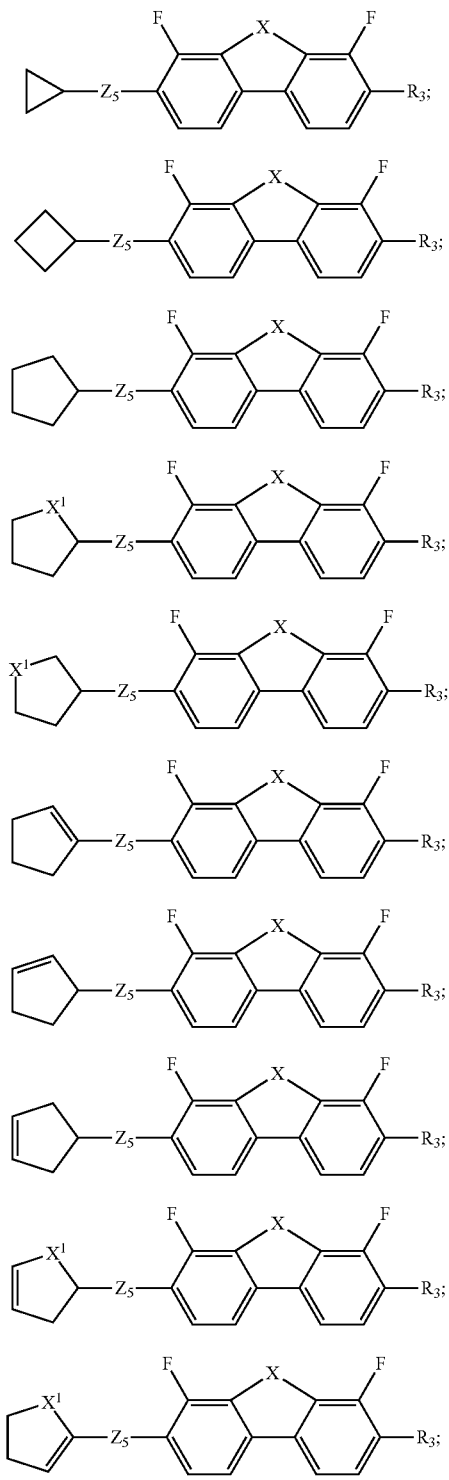

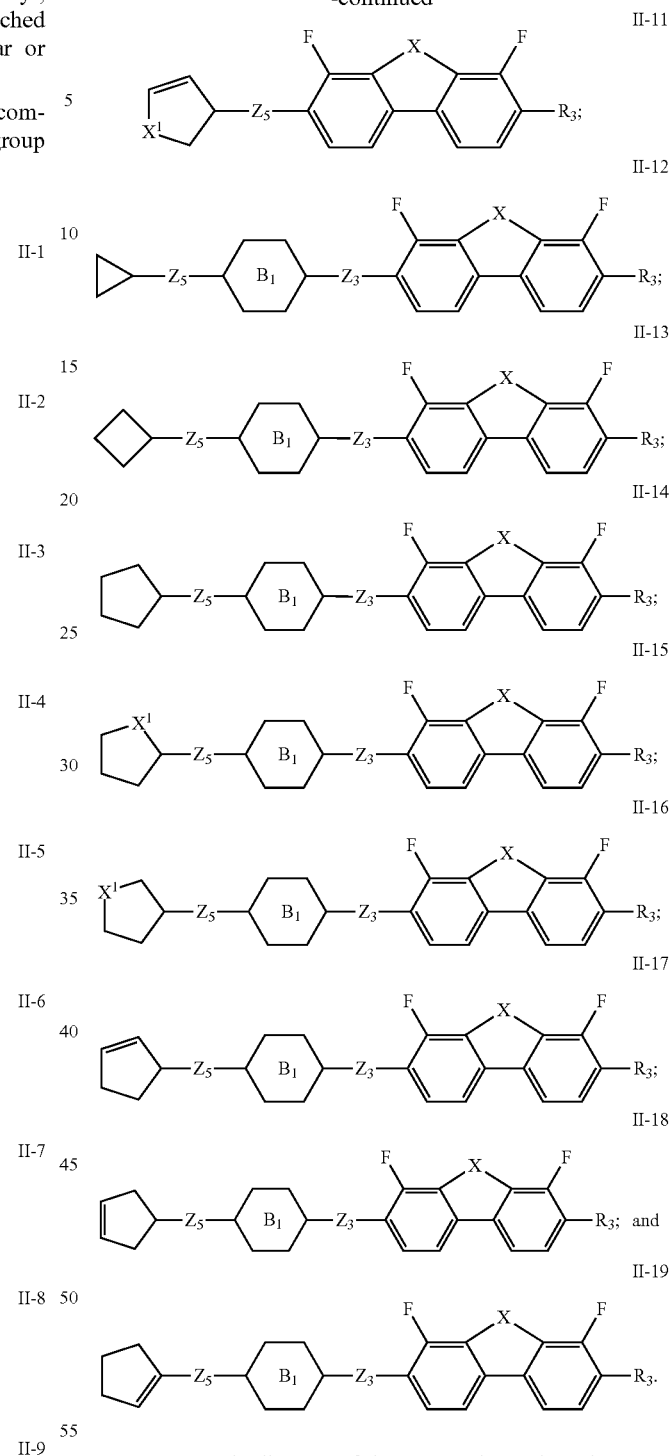

In some embodiments of the present invention, the compound of general formula II is selected from a group consisting of the compound of general formula II-1, the compound of general formula II-2, the compound of general formula II-3, the compound of general formula II-4, the compound of general formula II-5, the compound of general formula II-6, the compound of general formula II-7, the compound of general formula II-8, the compound of general formula II-9, the compound of general formula II-10 and the compound of general formula II-11.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula II is selected from a group consisting of the compound of general formula II-3, the compound of general formula II-4, the compound of general formula II-5 and the compound of general formula II-10.

In some embodiments of the present invention, it is preferred to adjust the content of the compound of general formula II so as to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability.

In some embodiments of the present invention, the compound of formula II provides (in percentage by weight) 0.1%-25% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%; preferably, the compound of general formula II provides (in percentage by weight) 1%-20% of the liquid crystal composition.

In some embodiments of the present invention, the liquid crystal composition of the present invention further comprises at least one compound of general formula M:

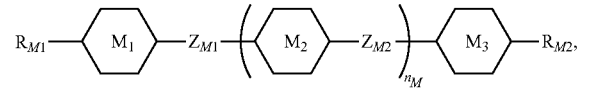

M wherein, $R_{M1}$ and $R_{M2}$ each independently represents $C_{1-12}$ linear or branched alkyl,

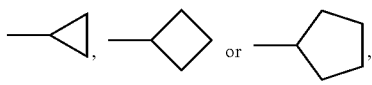

wherein one or more than two nonadjacent —CH$_2$— in the $C_{1-12}$ linear or branched alkyl can each be independently replaced by —CH=CH—, —C≡C—, —O—, —CO—, —CO—O— or —O—CO—;

ring

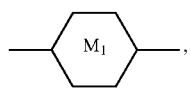

ring

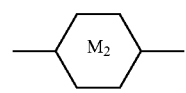

and ring

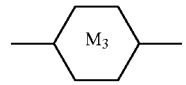

each independently represents

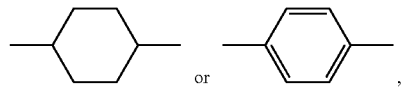

wherein one or more —CH$_2$— in

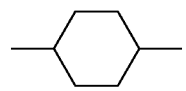

can be replaced by —O—, and one or more single bond in the ring can be replaced by double bond, and wherein at most one —H on

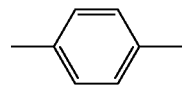

can be substituted by halogen;

$Z_{M1}$ and $Z_{M2}$ each independently represents single bond, —CO—O—, —O—CO—, —CH$_2$O—, —OCH$_2$—, —C≡C—, —CH=CH—, —CH$_2$CH$_2$— or —(CH$_2$)$_4$—; and $n_M$ represents 0, 1 or 2, wherein when $n_M$=2, ring

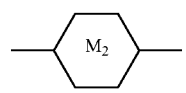

can be the same or different, $Z_{M2}$ can be the same or different.

The alkenyl group in the present invention is preferably selected from the groups represented by any one of formula (V1) to formula (V9), particularly preferably formula (V1), formula (V2), formula (V8) or formula (V9). The groups represented by formula (V1) to formula (V9) are as follows:

 (V1)

 (V2)

 (V3)

 (V4)

(V5)
(V6)
(V7)
(V8)
(V9)

in which, * represents carbon atom that is bound in the ring structure.

The alkenoxy group in the present invention is preferably selected from the groups represented by any one of formula (OV1) to formula (OV9), particularly preferably formula (OV1), formula (OV2), formula (OV8) or formula (OV9). The groups represented by formula (OV1) to formula (OV9) are as follows:

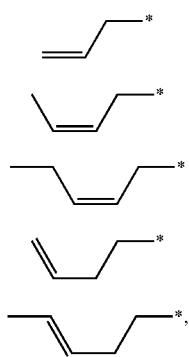

(OV1)
(OV2)
(OV3)
(OV4)
(OV5)
(OV6)
(OV7)
(OV8)
(OV9)

in which, * represents carbon atom that is bound in the ring structure.

In some embodiments of the present invention, the compound of general formula M is selected from a group consisting of the following compounds:

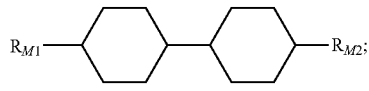
M-1

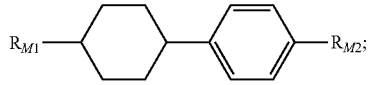
M-2

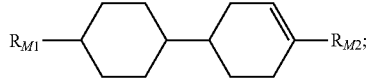
M-3

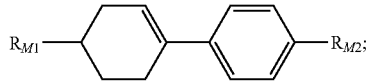
M-4

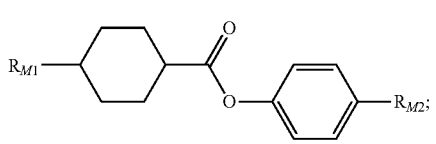
M-5

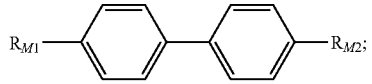
M-6

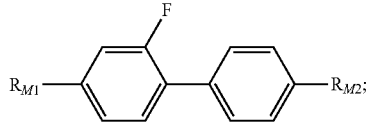
M-7

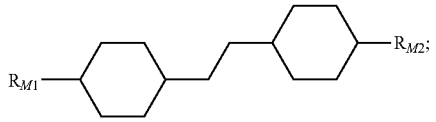
M-8

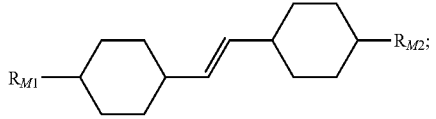
M-9

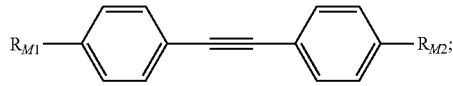
M-10

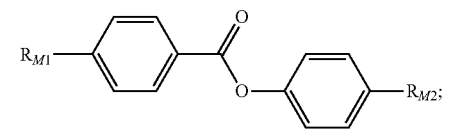
M-11

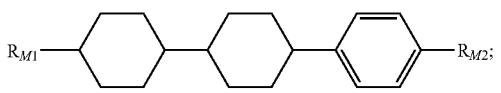
M-12

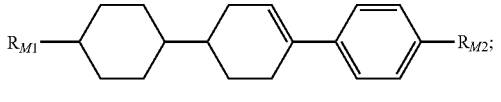
M-13

M-14

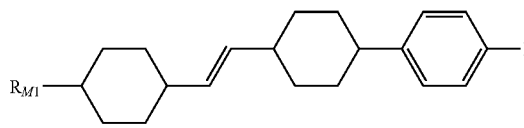
M-15

M-16

M-17

M-18

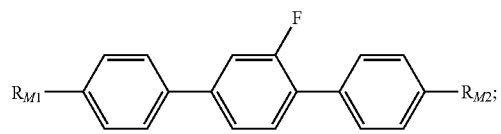
M-19

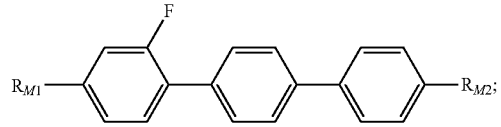
M-20

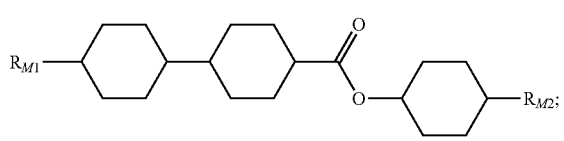
M-21

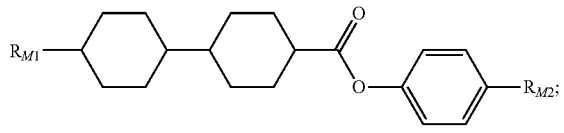
M-22

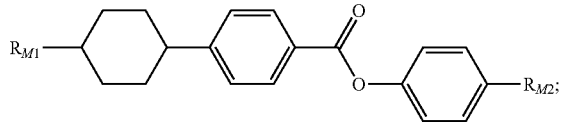
M-23

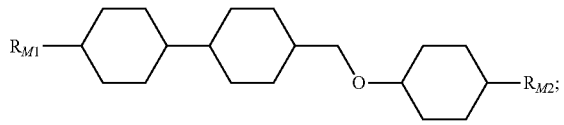
M-24

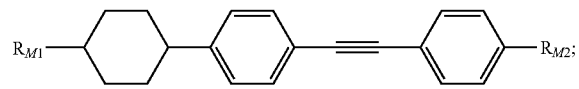
M-25

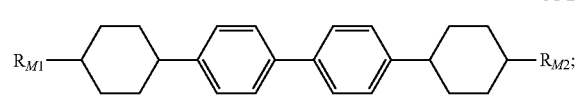
M-26

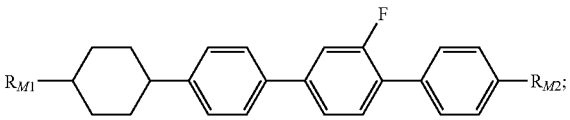
M-27

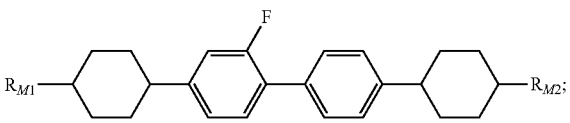
M-28

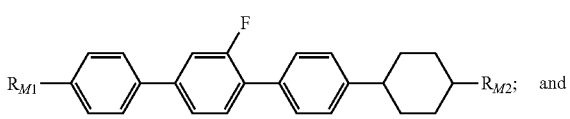
M-29 and

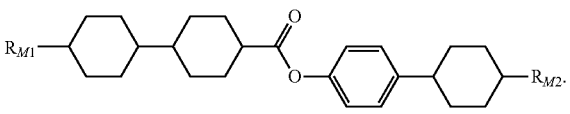
M-30

In some embodiments of the present invention, the compound of general formula M is selected from a group consisting of the compound of general formula M-1, the compound of general formula M-2, the compound of general formula M-6, the compound of general formula M-12, the compound of general formula M-13, the compound of general formula M-16, the compound of general formula M-19, the compound of general formula M-26 and the compound of general formula M-30.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula M is selected from a group consisting of the compound of general formula M-1, the compound of general formula M-2, the compound of general formula M-6 and the compound of general formula M-12.

In some embodiments of the present invention, it is preferred to adjust the content of the compound of general formula M so as to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability.

In some embodiments of the present invention, the compound of general formula M provides (in percentage by weight) 0.1%-80% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%, 26%, 28%, 30%, 32%, 34%, 35%, 36%, 38%, 40%, 42%, 44%, 46%, 48%, 50%, 52%, 54%, 56%, 58%, 60%, 62%, 64%, 66%, 68%, 70%, 72%, 74%, 76%, 78%, 80%; preferably, the compound of general formula M provides (in percentage by weight) 1%-60% of the liquid crystal composition.

In some embodiments of the present invention, the content of the compound of general formula M must be appropriately adjusted depending on the required performance such as low temperature solubility, transition temperature, electrical reliability, birefringence index, process adaptability, drop trace, "burn-in", dielectric anisotropy and so on.

Regarding the content of the compound of general formula M, the lower limit value and the upper limit value of the content of the compound of general formula M are preferably higher when it is desired to maintain the liquid crystal composition of the present invention with a lower viscosity and a shorter response time; further, the lower limit value and the upper limit value of the content of the compound of general formula M are preferably higher when it is desired to maintain the liquid crystal composition of the present invention with a higher clearing point and a good temperature stability; the lower limit value and the upper limit value of the content of the compound of general formula M are preferably decreased in order to maintain the driving voltage lower and make the absolute value of dielectric anisotropy larger.

In some embodiments of the present invention, preferably, $R_{M1}$ and $R_{M2}$ each independently represents $C_{1-10}$ linear or branched alkyl, $C_{1-9}$ linear or branched alkoxy, or $C_{2-10}$ linear or branched alkenyl; further preferably, $R_{M1}$ and $R_{M2}$ each independently represents $C_{1-8}$ linear or branched alkyl, $C_{1-7}$ linear or branched alkoxy, or $C_{2-8}$ linear or branched alkenyl; still further preferably, $R_{M1}$ and $R_{M2}$ each independently represents $C_{1-5}$ linear or branched alkyl, $C_{1-4}$ linear or branched alkoxy, or $C_{2-5}$ linear or branched alkenyl.

In some embodiments of the present invention, preferably, $R_{M1}$ and $R_{M2}$ each independently represents $C_{2-8}$ linear alkenyl; further preferably, $R_{M1}$ and $R_{M2}$ each independently represents $C_{2-5}$ linear alkenyl.

In some embodiments of the present invention, preferably, one of $R_{M1}$ and $R_{M2}$ is $C_{2-5}$ linear alkenyl and the other is $C_{1-5}$ linear alkyl.

In some embodiments of the present invention, preferably, $R_{M1}$ and $R_{M2}$ each independently represents $C_{1-8}$ linear alkyl or $C_{1-7}$ linear alkoxy; further preferably, $R_{M1}$ and $R_{M2}$ each independently represents $C_{1-5}$ linear alkyl or $C_{1-4}$ linear alkoxy.

In some embodiments of the present invention, preferably, one of $R_{M1}$ and $R_{M2}$ is $C_{1-5}$ linear alkyl and the other is $C_{1-5}$ linear alkyl or $C_{1-4}$ linear alkoxy; further preferably, each of $R_{M1}$ and $R_{M2}$ is independently $C_{1-5}$ linear alkyl.

In some embodiments of the present invention, with emphasis in reliability, both $R_{M1}$ and $R_{M2}$ are preferably alkyl; with emphasis in reducing the volatility of the compound, both $R_{M1}$ and $R_{M2}$ are preferably alkoxy; and with emphasis in reducing the viscosity, at least one of $R_{M1}$ and $R_{M2}$ is preferably alkenyl.

In some embodiments of the present invention, the liquid crystal composition of the present invention further comprises at least one compound of general formula N:

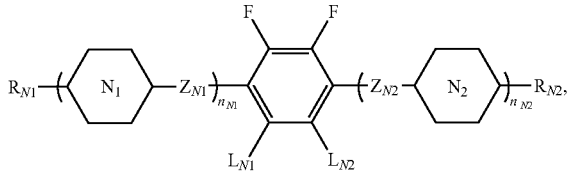

wherein, $R_{N1}$ and $R_{N2}$ each independently represents $C_{1-12}$ linear or branched alkyl,

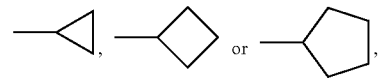

wherein one or more than two nonadjacent —$CH_2$— in the $C_{1-12}$ linear or branched alkyl can each be independently replaced by —CH=CH—, —C≡C—, —O—, —CO—, —CO—O— or —O—CO—;

ring

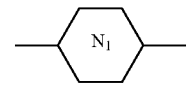

and ring

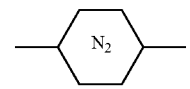

each independently represents

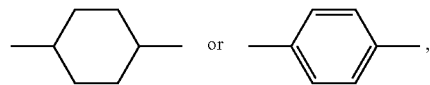

wherein one or more —$CH_2$— in

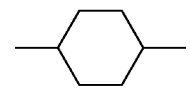

can be replaced by —O—, and one or more single bond in the ring can be replaced by double bond, wherein one or more —H on

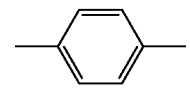

can each be independently substituted by —F, —Cl or —CN, and one or more —CH= in the ring can be replaced by —N=;

$Z_{N1}$ and $Z_{N2}$ each independently represents single bond, —CO—O—, —O—CO—, —$CH_2$O—, —O$CH_2$—, —CH=CH—, —C≡C—, —$CH_2CH_2$—, —$CF_2CF_2$—, —$(CH_2)_4$—, —$CF_2$O— or —O$CF_2$—;

$L_{N1}$ and $L_{N2}$ each independently represents —H, $C_{1-3}$ alkyl or halogen; and $n_{N1}$ represents 0, 1, 2 or 3, $n_{N2}$ represents 0 or 1, and $0 \leq n_{N1}+n_{N2} \leq 3$, wherein when $n_{N1}=2$ or 3, ring

can be the same or different, $Z_{N1}$ can be the same or different.
In some embodiments of the present invention, the compound of general formula N is selected from a group consisting of the following compounds:
N-1
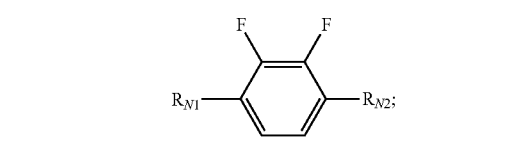
N-2
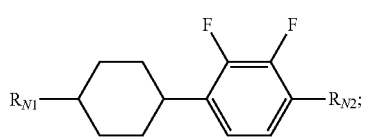
N-3
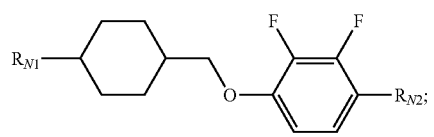
N-4
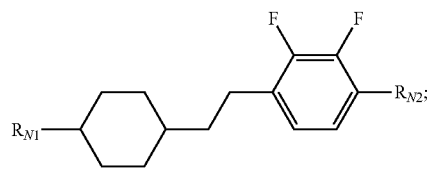
N-5
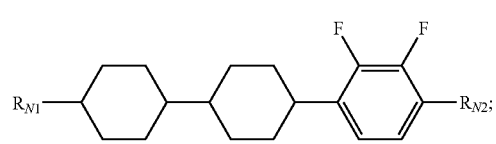
N-6
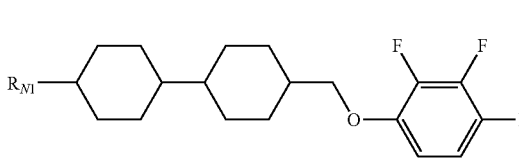
N-7
N-8
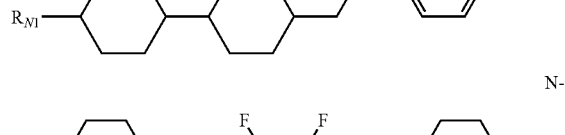
-continued
N-9
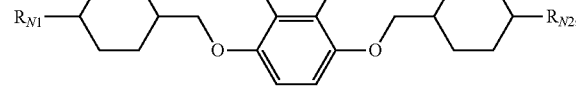
N-10
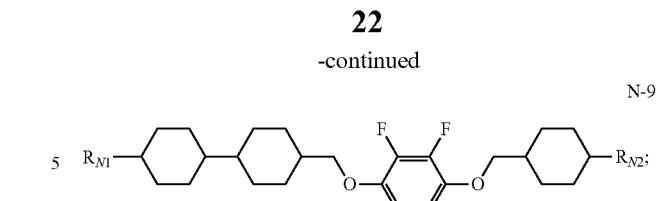
N-11
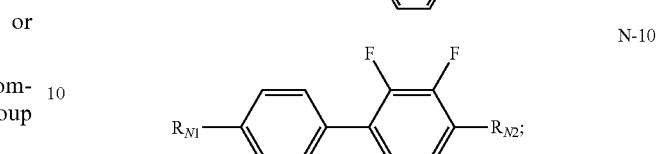
N-12
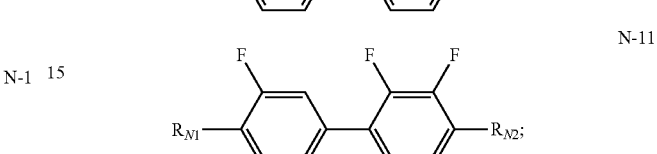
N-13
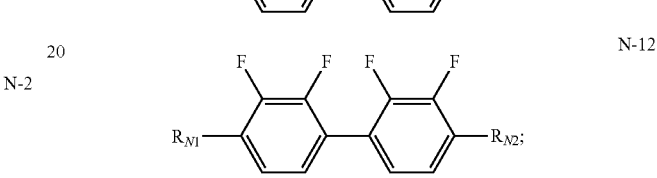
N-14
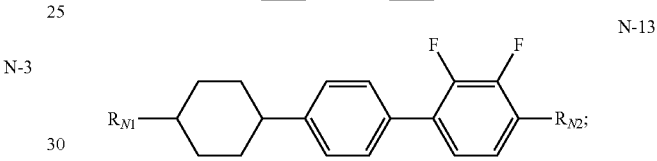
N-15
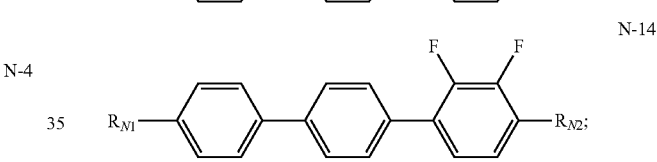
N-16
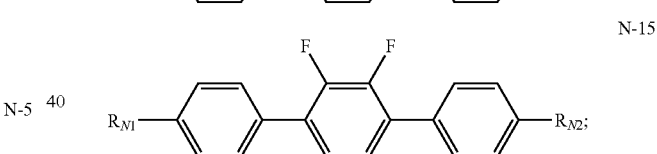
N-17
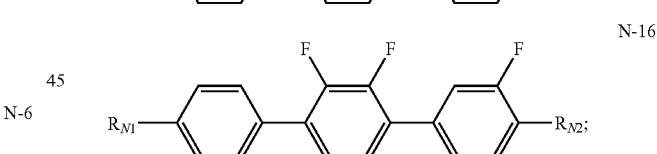
N-18
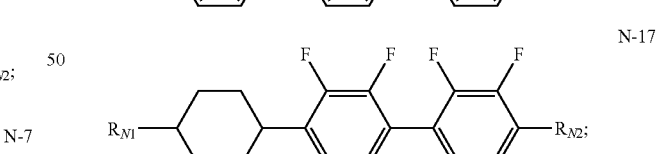
N-19
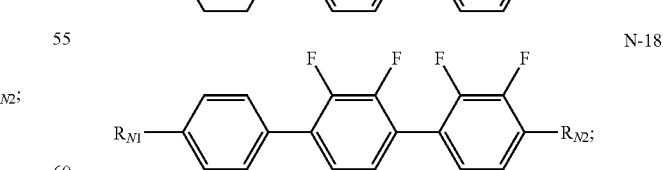

N-20
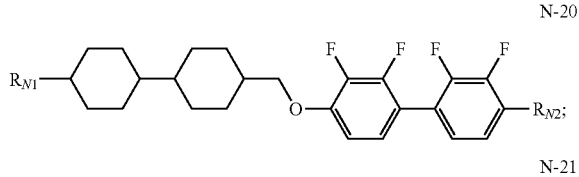

N-21
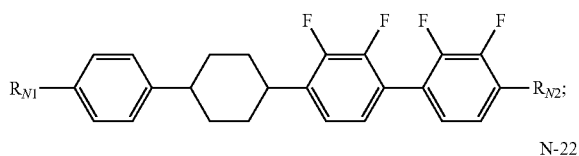

N-22
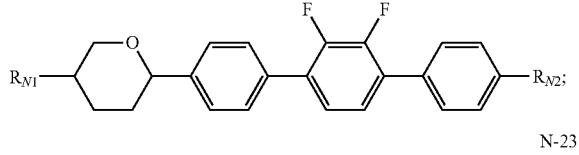

N-23
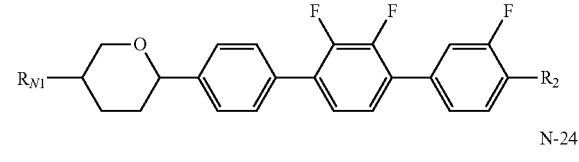

N-24
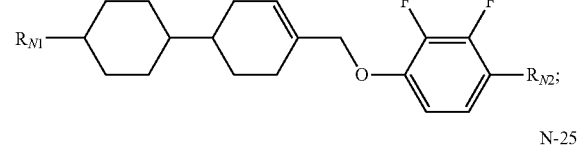

N-25
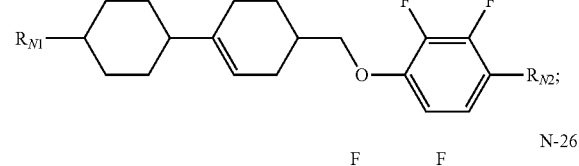

N-26
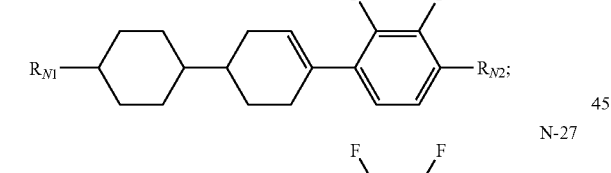

N-27
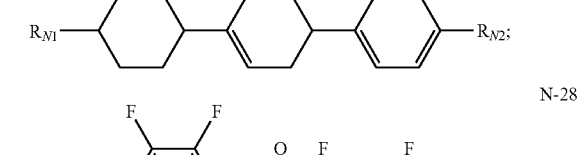

N-28
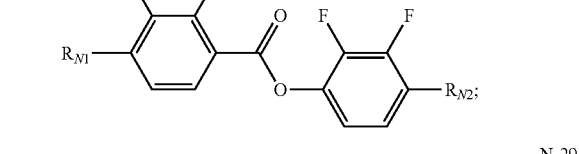

N-29
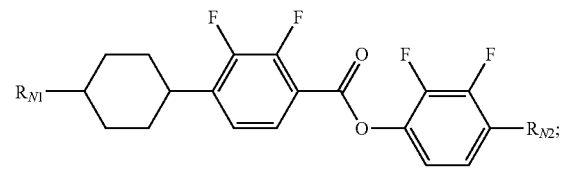

N-30
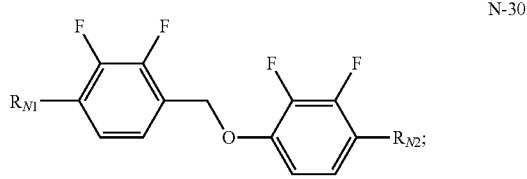

N-31
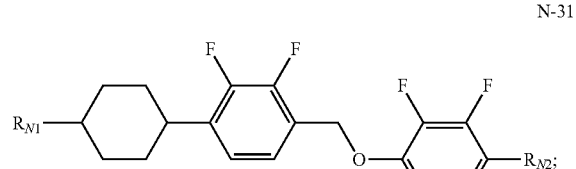

N-32
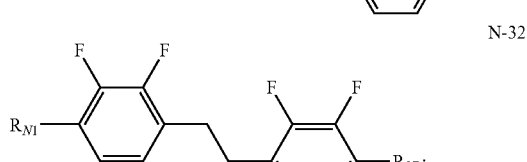

N-33
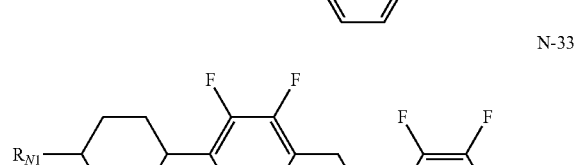

N-34
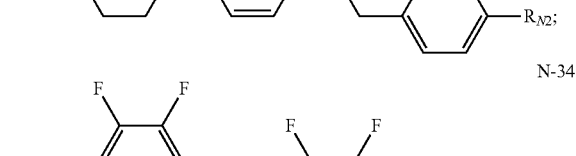  and

N-35
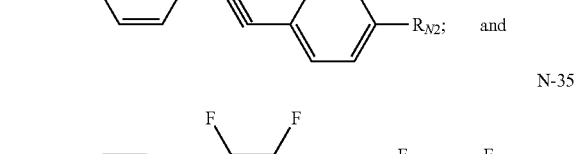

In some embodiments of the present invention, the compound of general formula N is selected from a group consisting of the compound of general formula N-1, the compound of general formula N-2, the compound of general formula N-3, the compound of general formula N-5, the compound of general formula N-6, the compound of general formula N-10, the compound of general formula N-11, the compound of general formula N-12, the compound of general formula N-13, the compound of general formula N-15, the compound of general formula N-24 and the compound of general formula N-26.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula N is selected from a group consisting of the compound of general formula N-2, the compound of general formula N-3, the compound of general formula N-5, the compound of general formula N-6, the compound of general formula N-10, the compound of general formula N-11, the compound of general formula N-12, the compound of general formula N-13, the compound of general formula N-15, the compound of general formula N-24 and the compound of general formula N-26.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula N is selected from a group consisting of the compound of general formula N-2 and the compound of general formula N-5.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula N is selected from a group consisting of the compound of general formula N-3 and the compound of general formula N-6.

In some embodiments of the present invention, in order to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, the compound of general formula N is selected from a group consisting of the compound of general formula N-10 and the compound of general formula N-13.

In some embodiments of the present invention, it is preferred to adjust the content of the compound of general formula N so as to obtain a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability.

In some embodiments of the present invention, the compound of general formula N provides (in percentage by weight) 0.1%-65% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%, 26%, 28%, 30%, 32%, 34%, 35%, 36%, 38%, 40%, 42%, 44%, 46%, 48%, 50%, 52%, 54%, 56%, 58%, 60%; preferably, the compound of general formula N provides (in percentage by weight) 1%-60% of the liquid crystal composition.

In some embodiments of the present invention, the lower limit value and the upper limit value of the content of the compound of general formula N are preferably lower when it is desired to maintain the liquid crystal composition of the present invention with a lower viscosity and a shorter response time; further, the lower limit value and the upper limit value of the content of the compound of general formula N are preferably lower when it is desired to maintain the liquid crystal composition of the present invention with a higher clearing point and a good temperature stability; in addition, the lower limit value and the upper limit value of the content of the compound of general formula N are preferably increased in order to maintain the driving voltage lower and make the absolute value of the dielectric anisotropy larger.

In some embodiments of the present invention, preferably, $R_{N1}$ and $R_{N2}$ each independently represents $C_{1-10}$ linear or branched alkyl, $C_{1-9}$ linear or branched alkoxy, or $C_{2-10}$ linear or branched alkenyl; further preferably, $R_{N1}$ and $R_{N2}$ each independently represents $C_{1-8}$ linear or branched alkyl, $C_{1-7}$ linear or branched alkoxy, or $C_{2-8}$ linear or branched alkenyl, still further preferably, $R_{N1}$ and $R_{N2}$ each independently represents $C_{1-5}$ linear or branched alkyl, $C_{1-4}$ linear or branched alkoxy, or $C_{2-5}$ linear or branched alkenyl.

In some embodiments of the present invention, the liquid crystal composition of the present invention further comprises at least one compound of general formula A-1 and/or general formula A-2:

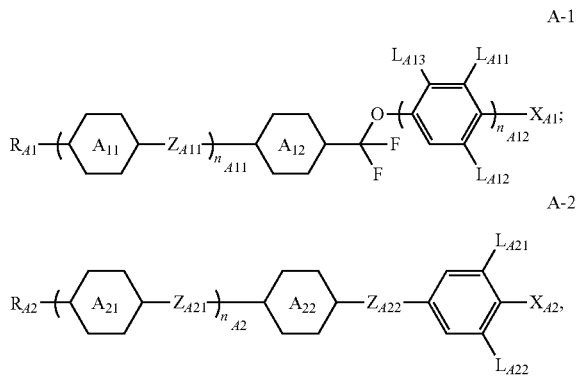

wherein,
$R_{A1}$ and $R_{A2}$ each independently represents $C_{1-12}$ linear or branched alkyl,

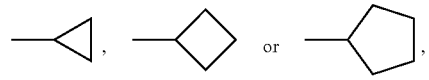

wherein one or more than two nonadjacent —$CH_2$— in the $C_{1-12}$ linear or branched alkyl can each be independently replaced by —CH=CH—, —C≡C—, —O—, —CO—, —CO—O— or —O—CO—, and one or more —H on the $C_{1-12}$ linear or branched alkyl,

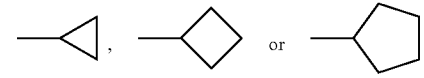

can each be independently substituted by —F or —Cl;
ring

ring

ring

and ring

each independently represents

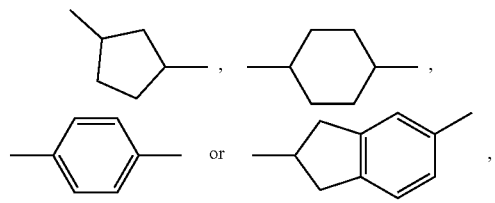

wherein one or more —CH₂— in

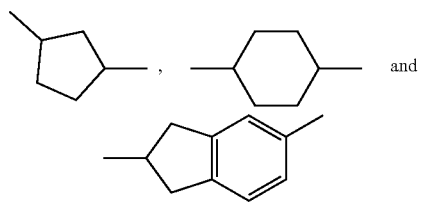

can each be independently replaced by —O—, and one or more single bond in the ring can each be independently replaced by double bond, wherein one or more —H on ring

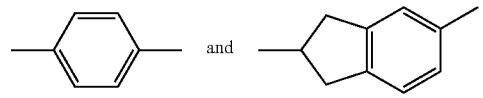

can each be independently substituted by —F, —Cl or —CN, and one or more —CH= in the ring can each be replaced independently by —N=;

$Z_{A11}$, $Z_{A21}$ and $Z_{A22}$ each independently represents single bond, —CH₂CH₂—, —CF₂CF₂—, —CO—O—, —O—CO—, —O—CO—O—, —CH=CH—, —CF=CF—, —CH₂O— or —OCH₂—;

$L_{A11}$, $L_{A12}$, $L_{A13}$, $L_{A21}$ and $L_{A22}$ each independently represents —H, $C_{1-3}$ alkyl or halogen;

$X_{A1}$ and $X_{A2}$ each independently represents halogen, $C_{1-5}$ linear or branched halogenated alkyl or halogenated alkoxy, or $C_{2-5}$ linear or branched halogenated alkenyl or halogenated alkenoxy;

$n_{A11}$ represents 0, 1, 2 or 3, wherein when $n_{A11}$=2 or 3, ring

can be the same or different, $Z_{A11}$ can be the same or different;

$N_{A12}$ represents 1 or 2, wherein when $n_{A12}$=2, ring

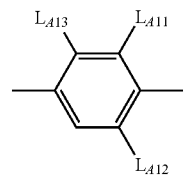

can be the same or different; and $n_{A2}$ represents 0, 1, 2 or 3, wherein when $n_{A2}$=2 or 3, ring

can be the same or different, $Z_{A21}$ can be the same or different.

In some embodiments of the present invention, the compound of general formula A-1 is selected from a group consisting of the following compounds:

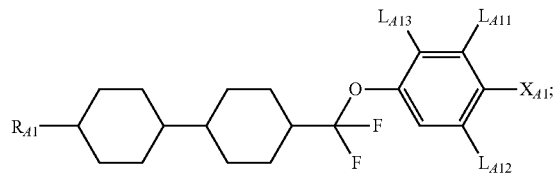

A-1-1

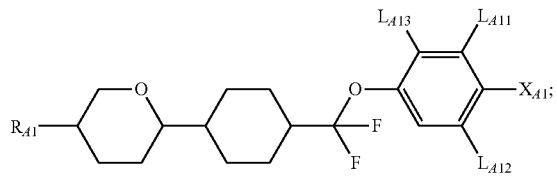

A-1-2

-continued
A-1-3
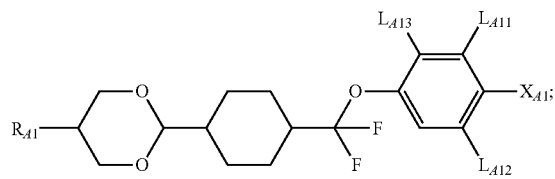
A-1-4
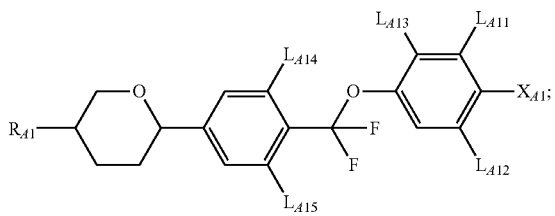
A-1-5
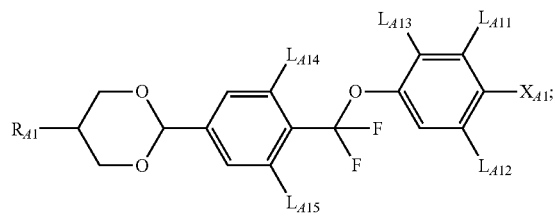
A-1-6
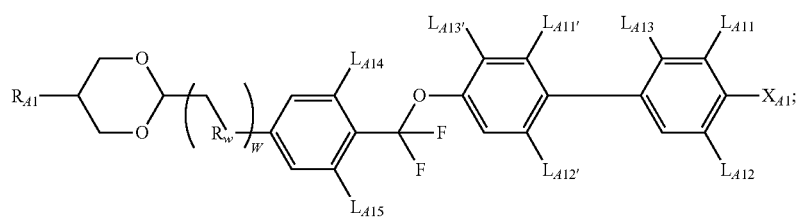
A-1-7
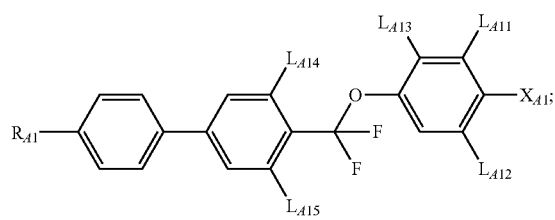
A-1-8
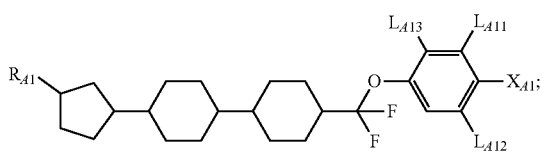
A-1-9
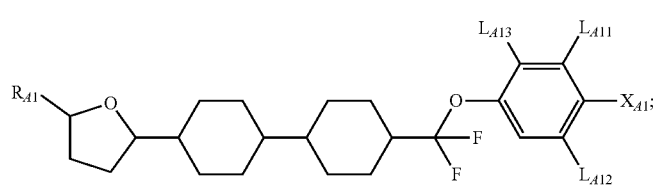
A-1-10
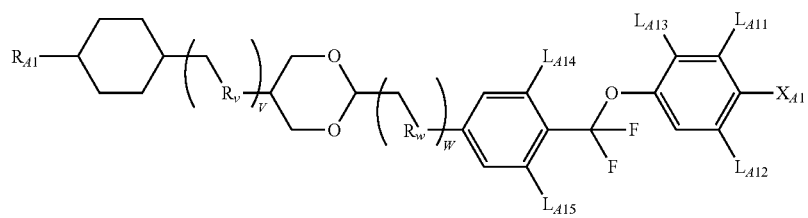
A-1-11
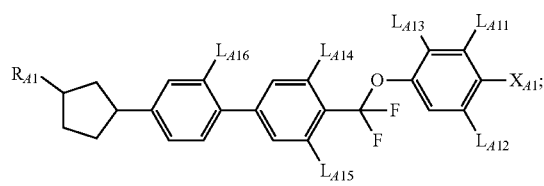
A-1-12
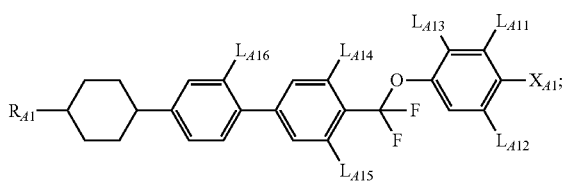

-continued

A-1-13
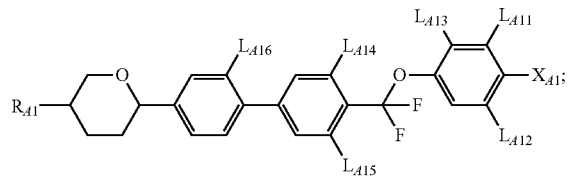

A-1-14
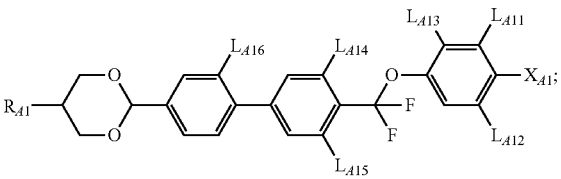

A-1-15
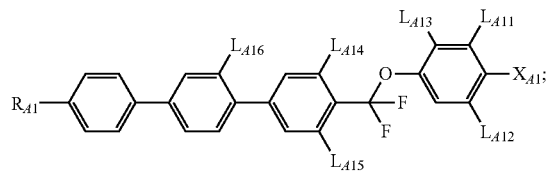

A-1-16
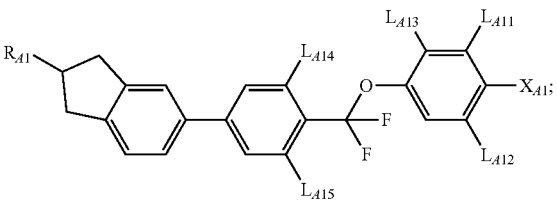

A-1-17
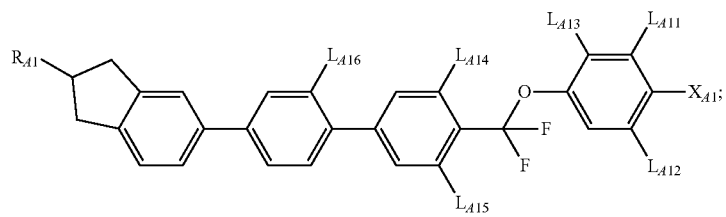

A-1-18
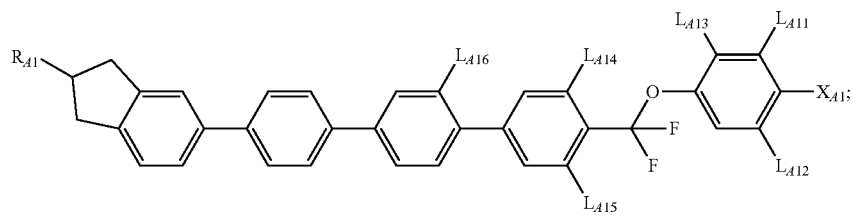

wherein,
- $R_{A1}$ represents $C_{1-8}$ linear or branched alkyl, wherein one or more than two nonadjacent —$CH_2$— in $C_{1-8}$ linear or branched alkyl can each be independently replaced by —CH=CH—, —C≡C—, —O—, —CO—, —CO—O— or —O—CO—, and one or more —H present in these groups can each be independently substituted by —F or —Cl;
- $R_v$ and $R_w$ each independently represents —$CH_2$— or —O—;
- $L_{A11}$, $L_{A12}$, $L_{A11}'$, $L_{A12}'$, $L_{A14}$, $L_{A15}$ and $L_{A16}$ each independently represents —H or —F;
- $L_{A13}$ and $L_{A13}'$ each independently represents —H or —$CH_3$;
- $X_{A1}$ represents —F, —$CF_3$ or —$OCF_3$; and
- v and w each independently represents 0 or 1.

In some embodiments of the present invention, the compound of general formula A-1 provides (in percentage by weight) 0.1%-50% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%, 26%, 28%, 30%, 32%, 34%, 35%, 36%, 38%, 40%, 42%, 44%, 46%, 48%, 50%.

Regarding the preferred content of the compound of general formula A-1, it is preferred that the lower limit value and the upper limit value of the content of the compound of general formula A-1 are slightly lower when maintaining the liquid crystal composition of the present invention with a lower viscosity and a faster response speed; further, it is preferred that the lower limit value and the upper limit value of the content of the compound of general formula A-1 are slightly lower when maintaining the liquid crystal composition of the present invention with a higher clearing point and a good temperature stability; in addition, it is preferred that the lower limit value and the upper limit value of the content of the compound of general formula A-1 are slightly higher in order to maintain the driving voltage lower and increase the absolute value of dielectric anisotropy.

In some embodiments of the present invention, the compound of general formula A-2 is selected from a group consisting of the following compounds:

A-2-1
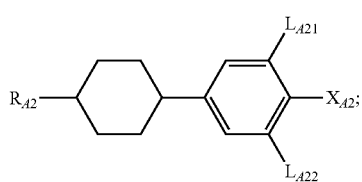

A-2-2 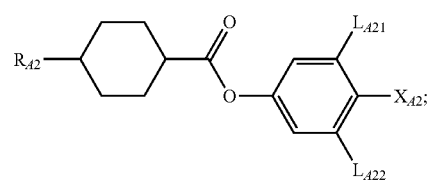
A-2-3 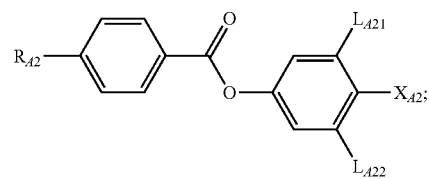
A-2-4 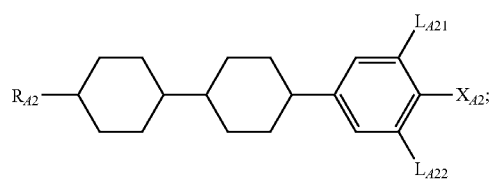
A-2-5 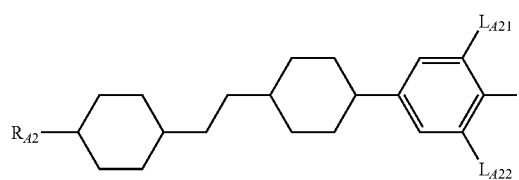
A-2-6 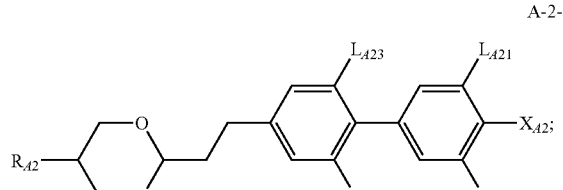
A-2-7 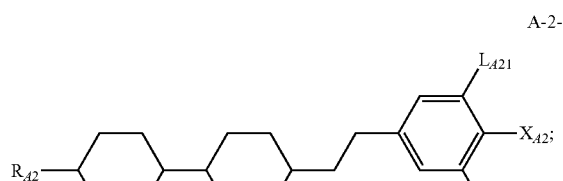
A-2-8 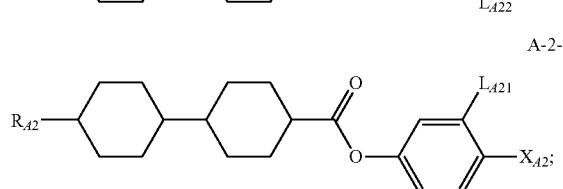
A-2-9 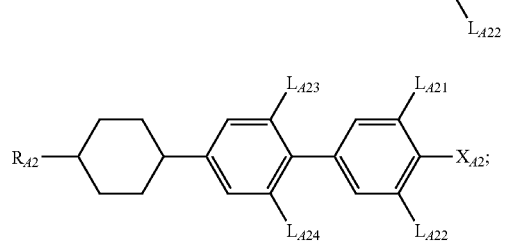
A-2-10 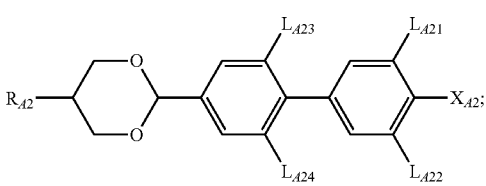
A-2-11 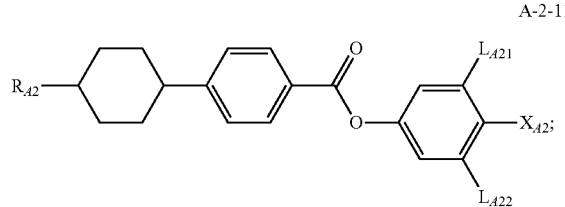
A-2-12 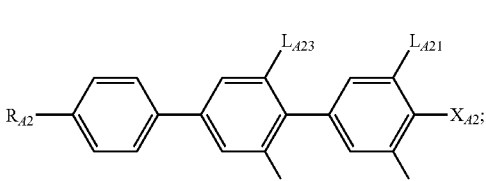
A-2-13 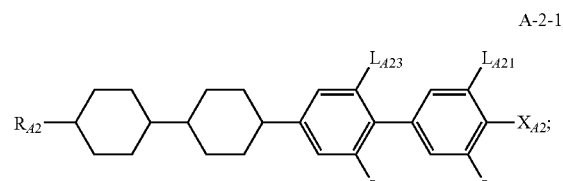
A-2-14 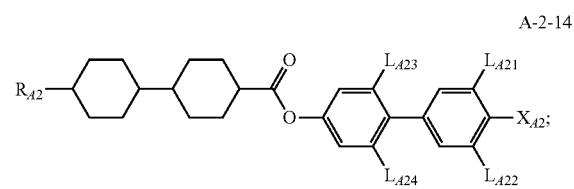
A-2-15 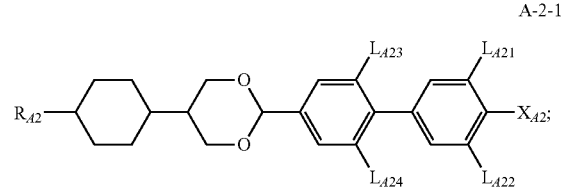
A-2-16 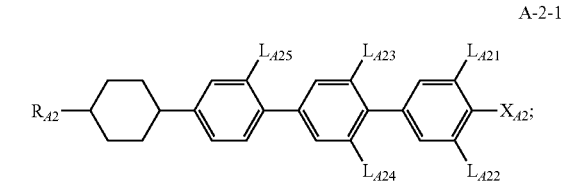
A-2-17 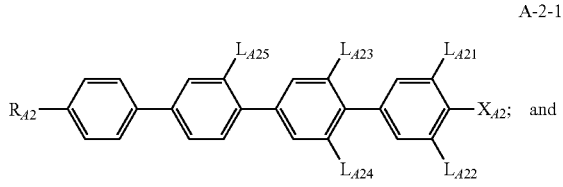 and -continued

A-2-18

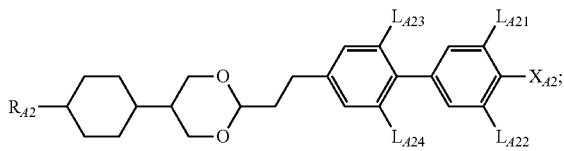

wherein, $R_{A2}$ represents $C_{1-8}$ linear or branched alkyl, wherein one or more than two nonadjacent —$CH_2$— in $C_{1-8}$ linear or branched alkyl can each be independently replaced by —CH=CH—, —C≡C—, —O—, —CO—, —CO—O— or —O—CO—, and one or more —H present in these groups can each be independently substituted by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$=$CF_2$.

In some embodiments of the present invention, the compound of general formula A-2 provides (in percentage by weight) 0.1%-50% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%, 26%, 28%, 30%, 32%, 34%, 35%, 36%, 38%, 40%, 42%, 44%, 46%, 48%, 50%.

Regarding the preferred content of the compound of general formula A-2, it is preferred that the lower limit value and the upper limit value of the content of the compound of general formula A-2 are slightly lower when maintaining the liquid crystal composition of the present invention with a lower viscosity and a faster response speed; further, it is preferred that the lower limit value and the upper limit value of the content of the compound of general formula A-2 are slightly lower when maintaining the liquid crystal composition of the present invention with a higher clearing point and a good temperature stability; in addition, it is preferred that the lower limit value and the upper limit value of the content of the compound of general formula A-2 are slightly higher in order to maintain the driving voltage lower and increase the absolute value of dielectric anisotropy.

In some embodiments of the present invention, the liquid crystal composition of the present invention further comprises at least one compound of general formula B

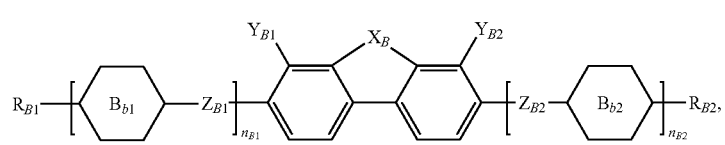

B wherein, $R_{B1}$ and $R_{B2}$ each independently represents —H, halogen, $C_{1-12}$ linear or branched alkyl, wherein one or more than two —$CH_2$— in the $C_{1-12}$ linear or branched alkyl can each be independently replaced by —CH=CH—, —C≡C—, —O—, —S—, —CO—, —CO—O— or —O—CO— in a manner that —O— are not directly connected to each other, and one or more —H on the foregoing groups can each be independently substituted by —F or —Cl;

ring

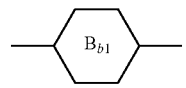

and ring

each independently represents

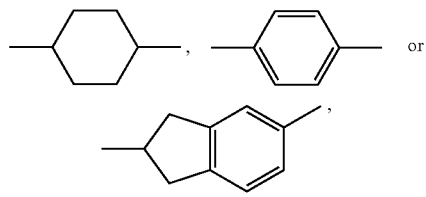

wherein one or more —$CH_2$— in

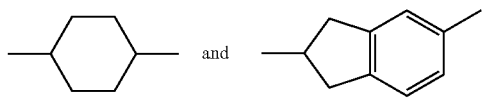

can each be independently replaced by —O—, and one or more single bond in the ring can each be independently replaced by double bond, wherein one or more —H on

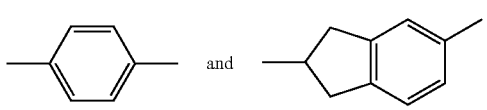

can each be independently substituted by —F, —Cl, —CN, —$CH_3$ or —$OCH_3$, and one or more —CH= in the ring can each be independently replaced by —N=;

$X_B$ represents —O—, —S—, —CO—, —$CF_2$—, —NH— or —NF—;

$Y_{B1}$ and $Y_{B2}$ each independently represents —H, halogen, $C_{1-3}$ halogenated or unhalogenated alkyl or $C_{1-3}$ halogenated or unhalogenated alkoxy;

$Z_{B1}$ and $Z_{B2}$ each independently represents single bond, —O—, —S—, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—; and $n_{B1}$ and $n_{B2}$ each independently represents 0, 1 or 2, wherein when $n_{B1}$=2, ring

can be the same or different, $Z_{B1}$ can be the same or different, wherein when $n_{B2}$=2, ring

can be the same or different, $Z_{B2}$ can be the same or different.

In some embodiments of the present invention, the compound of general formula B is selected from a group consisting of the following compounds:

B-1

B-2

B-3

B-4

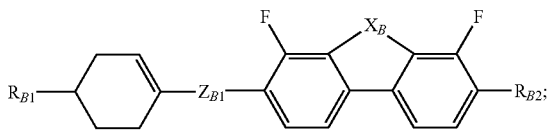

B-5

B-6 and

B-7

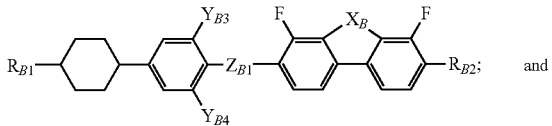

wherein, $Y_{B3}$ and $Y_{B4}$ each independently represents —H, —F, —Cl, —CN, —CH$_3$ or —OCH$_3$.

In some embodiments of the present invention, the compound of general formula B provides (in percentage by weight) 0.1%-30% of the liquid crystal composition, for example, 0.1%, 1%, 2%, 4%, 6%, 8%, 10%, 11%, 12%, 13%, 14%, 15%, 16%, 17%, 18%, 20%, 22%, 24%, 25%, 26%, 28% or 30%.

In some embodiments of the present invention, preferably, $R_{B1}$ and $R_{B2}$ each independently represents $C_{1-10}$ linear or branched alkyl, $C_{1-9}$ linear or branched alkoxy or $C_{2-10}$ linear or branched alkenyl; further preferably, $R_{B1}$ and $R_{B2}$ each independently represents $C_{1-8}$ linear or branched alkyl, $C_{1-7}$ linear or branched alkoxy or $C_{2-8}$ linear or branched alkenyl; still further preferably, $R_{B1}$ and $R_{B2}$ each independently represents $C_{1-5}$ linear or branched alkyl, $C_{1-4}$ linear or branched alkoxy or $C_{2-5}$ linear or branched alkenyl.

In some embodiments of the present invention, the liquid crystal composition of the present invention further comprises at least one self-alignment agent of general formula SA:

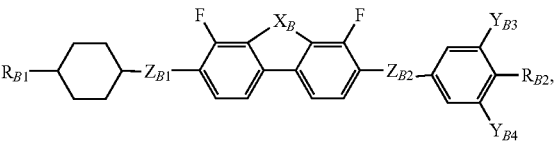

SA wherein, $R_{S1}$ represents Sp-P, $C_{1-12}$ linear or branched alkyl,

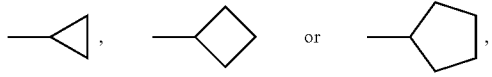

wherein one or more than two nonadjacent —$CH_2$— in the $C_{1-12}$ linear or branched alkyl can each be independently replaced by —CH=CH—, —C≡C—, —O—, —CO—, —CO—O— or —O—CO—, and one or more —H on the $C_{1-12}$ linear or branched alkyl,

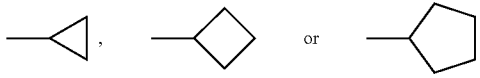

can each be independently substituted by —F or —Cl;

$R_{S2}$ represents anchoring group:

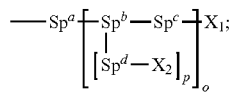

p represents 1 or 2, when p represents 2, -$Sp^d$-$X_2$ can be the same or different;

o represents 0 or 1;

$X_1$ and $X_2$ each independently represents —H, —OH, —SH, —$NH_2$, —$NHR^{11}$, —$NR^{11}{}_2$, $NHC(O)$—$R^{11}$, —$OR^{11}$, —C(O)OH, —CHO or $C_{1-12}$ linear or branched, halogenated or unhalogenated alkyl;

wherein, at least one of $X_1$ and $X_2$ is selected from —OH, —SH, —$NH_2$, —$NHR^{11}$, —C(O)OH or —CHO;

$Sp^a$, $Sp^c$ and $Sp^d$ each independently represents spacer group or single bond;

$Sp^b$ each independently represents

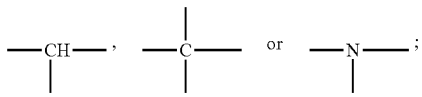

ring

and ring

each independently represents

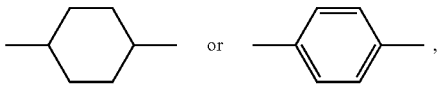

wherein one or more —$CH_2$— in

can be replaced by —O—, and one or more single bond in the ring can be replaced by double bond;

$L_s$ each independently represents —F, —Cl, —CN, —$NO_2$, —NCO, —NCS, —OCN, —SCN, —C(O)N$(R^0)_2$, —C(O)$R^0$, $C_{1-12}$ linear or branched alkyl,

wherein one or more than two nonadjacent —$CH_2$— in the $C_{1-12}$ linear or branched alkyl can each be independently replaced by —CH=CH—, —C≡C—, —O—, —CO—, —CO—O— or —O—CO—, and one or more —H on the $C_{1-12}$ linear or branched alkyl,

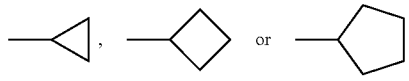

can each be independently substituted by —F;

$R^0$ and $R^{11}$ each independently represents $C_{1-12}$ linear or branched alkyl;

P represents polymerizable group;

Sp represents spacer group or single bond;

$n_{s1}$ represents 0 or 1;

$n_{s2}$ represents 0, 1, 2 or 3, when $n_{s2}$ represents 2 or 3,

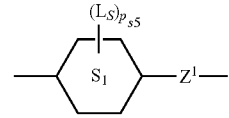

can be the same or different;

$p_{s1}$, $p_{s2}$, $p_{s3}$ and $p_{s4}$ each independently represents 0, 1 or 2, wherein $1 \leq p_{s1}+p_{s2} \leq 2$;

$p_{s5}$ and $p_{s6}$ each independently represents 0 or 1; and $Z^1$ and $Z^2$ each independently represents —O—, —S—, —CO—, —CO—O—, —O—CO—, —O—CO—O—, —$CH_2$O—, —$OCH_2$—, —$CH_2$S—, —$SCH_2$—, —$CF_2$O—, —$OCF_2$—, —$CF_2$S—, —$SCF_2$—, —$(CH_2)_n$—, —$CF_2CH_2$—, —$CH_2CF_2$—, —$(CF_2)_n$—, —CH=CH—, —CF=CF—, —CH=CF—, —CF=CH—, —C≡C—, —CH=CH—CO—O—, —O—CO—CH=CH—, —$CH_2CH_2$—CO—O—, —O—CO—$CH_2CH_2$—, —$CR^1R^2$— or single bond, wherein, $R^1$ and $R^2$ each independently represents —H or $C_{1-12}$ linear or branched alkyl, and n represents an integer of 1-4.

In some embodiments of the present invention, the self-alignment agent of general formula SA is selected from a group consisting of the following compounds:
SA-1
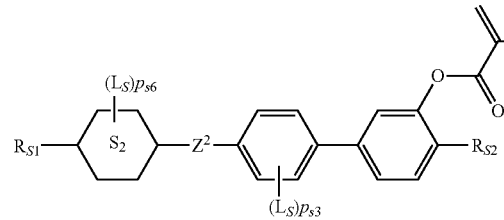
SA-2
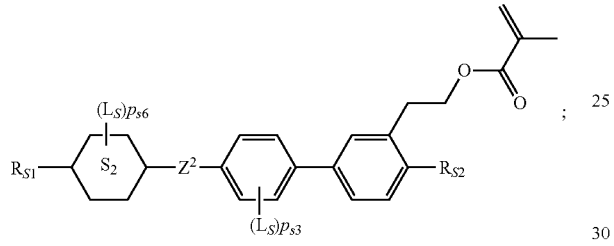
SA-3
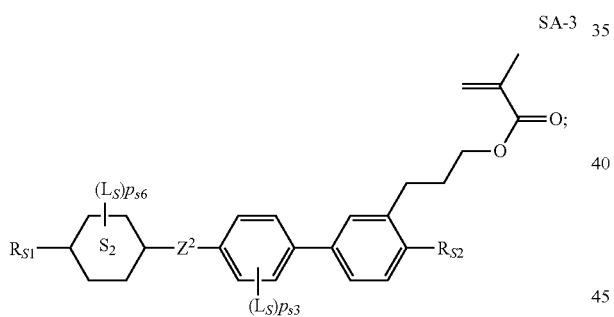
SA-4
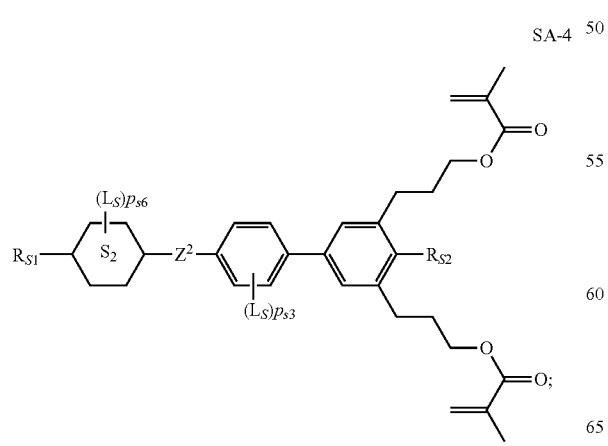
SA-5
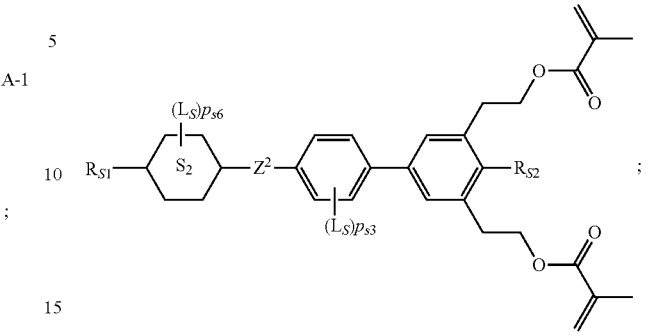
SA-6
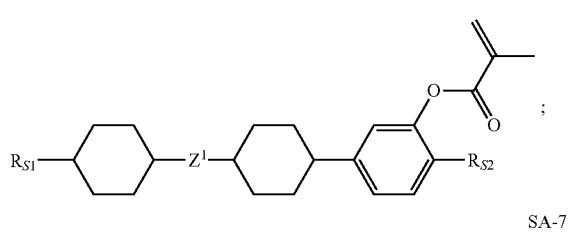
SA-7
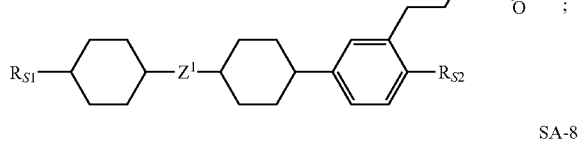
SA-8
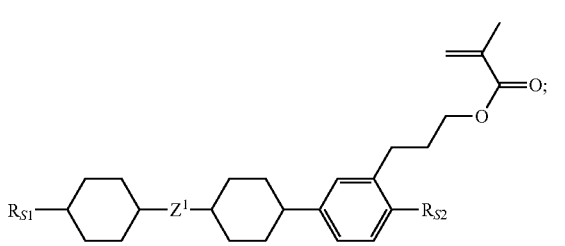
SA-9
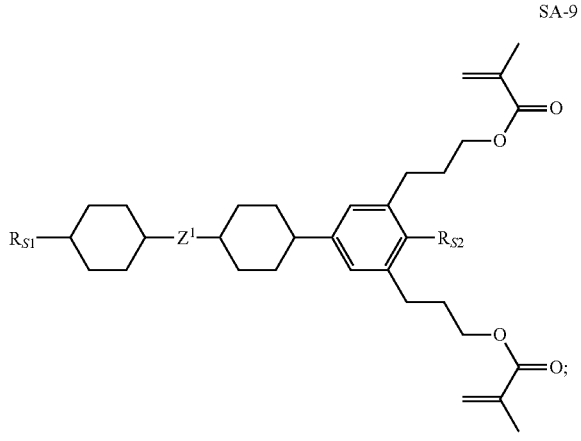

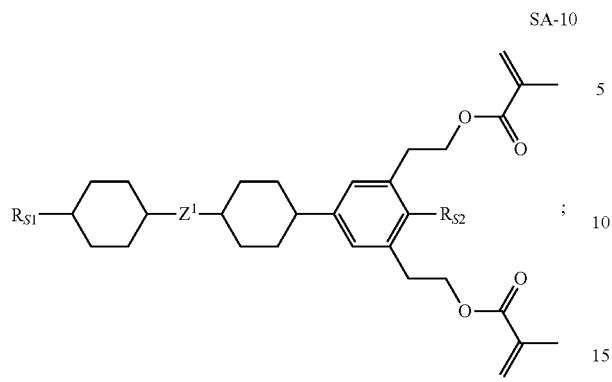
SA-10
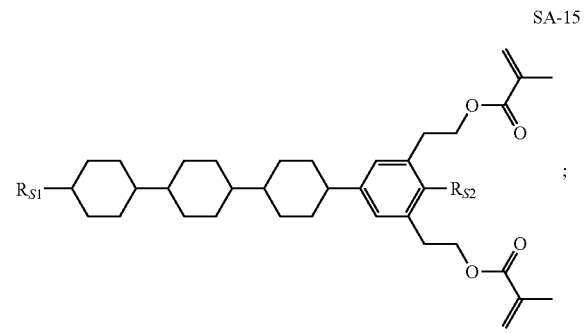
SA-15
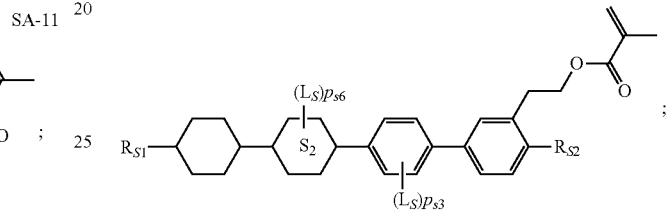
SA-11
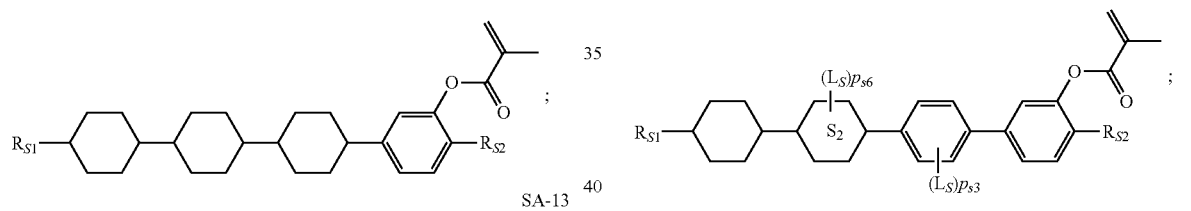
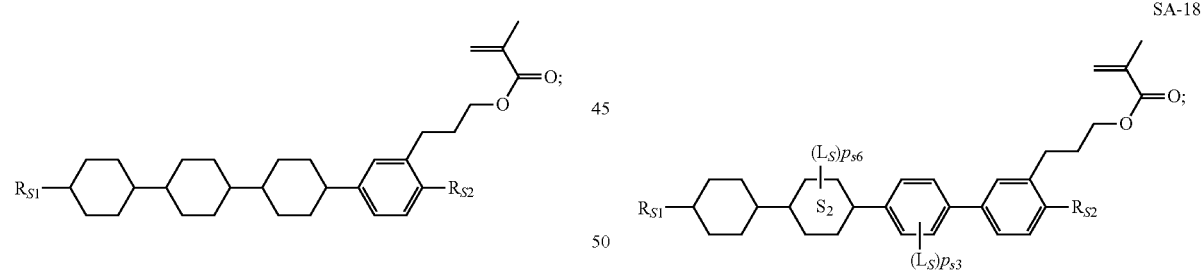
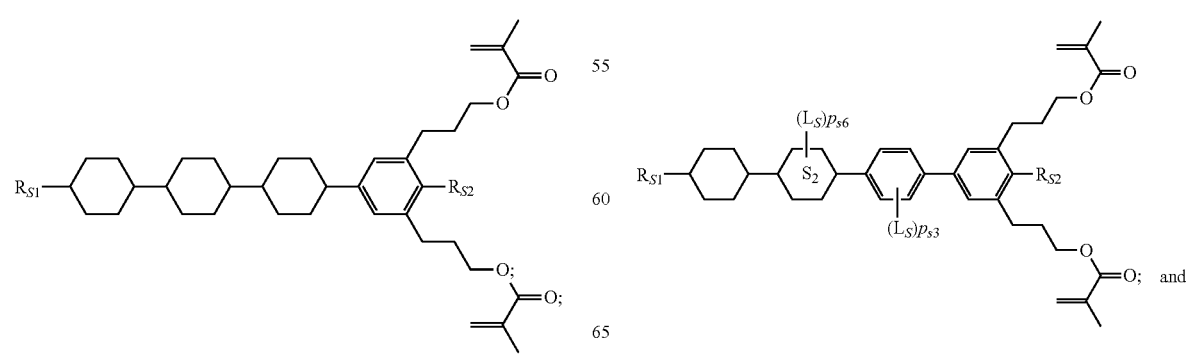

-continued

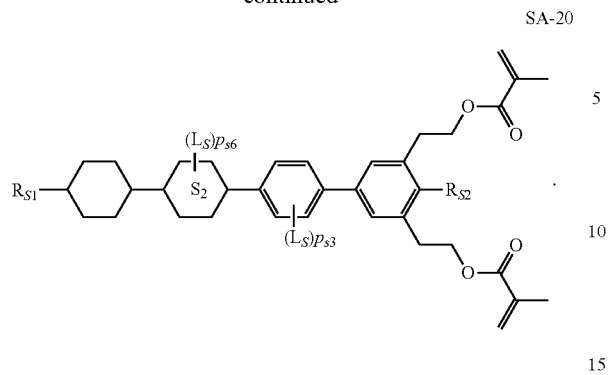

SA-20

In some embodiments of the present invention, $R_{S2}$ represents

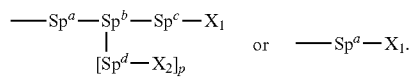

In some embodiments of the present invention, $R_{S2}$ represents

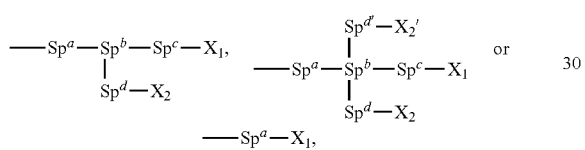

wherein, $Sp^{d'}$ represents spacer group or single bond;
$X_2'$ represents —H, —OH, —SH, —NH$_2$, —NHR$^{11}$, —NR$^{11}_2$, NHC(O)—R$^{11}$, —OR$^{11}$, —C(O)OH, —CHO or C$_{1-12}$ linear or branched, halogenated or unhalogenated alkyl, wherein R$^{11}$ represents C$_{1-12}$ linear or branched alkyl.

In some embodiments of the present invention, $R_{S2}$ is selected from a group consisting of the following groups:

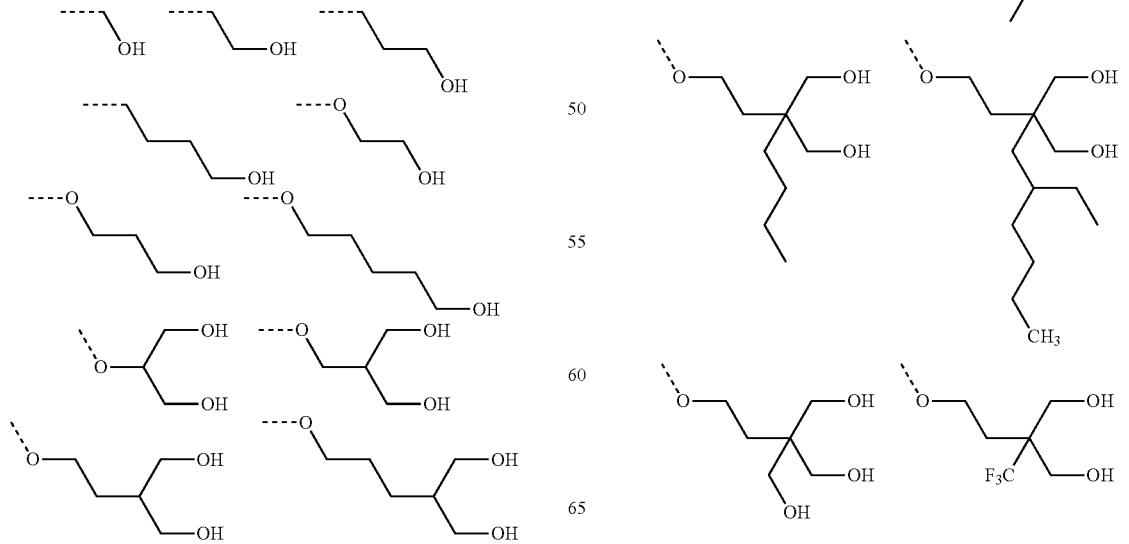

-continued

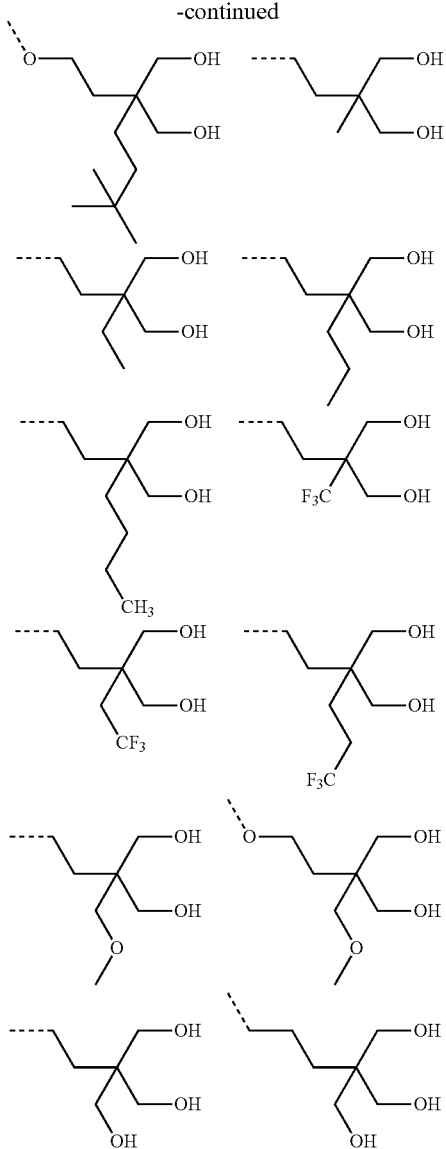

-continued

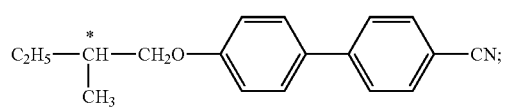

wherein, $R_{S2}$ is bonded to ring structure

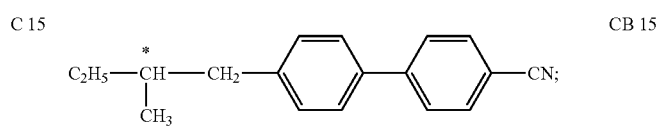

by the dash line.

In some embodiments of the present invention, the compound of general formula SA provides (in percentage by weight) 0.001%~5% of the liquid crystal composition, for example, 0.001%, 0.005%, 0.05%, 0.1%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 2%, 3%, 4% or 5%, etc.; preferably, the compound of general formula SA provides (in percentage by weight) 0.1%~2% of the liquid crystal composition.

In addition to the above compounds, the liquid crystal composition of the present invention may also contain normal nematic liquid crystal compound, smectic liquid crystal compound, cholesteric liquid crystal compound, dopants, antioxidant, ultraviolet absorber, infrared absorber, polymerizable monomer or light stabilizer and so forth.

Dopants which may be preferably added to the liquid crystal composition according to the present invention are shown below:

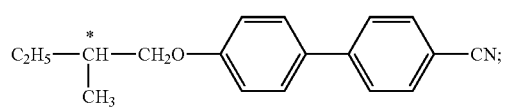
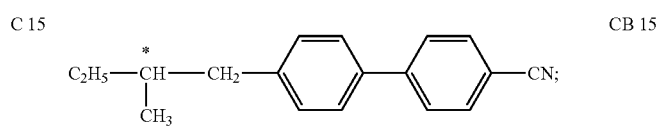
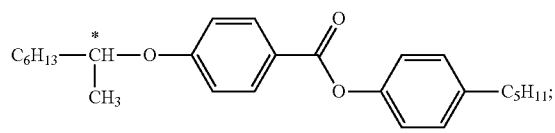
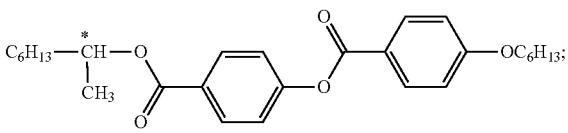
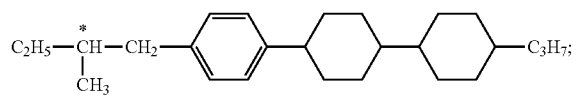
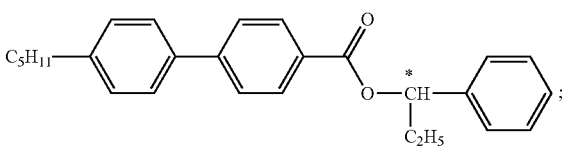

-continued

CM 47

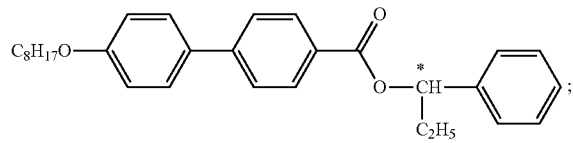

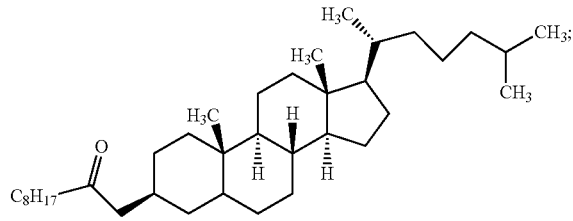

R/S-1011

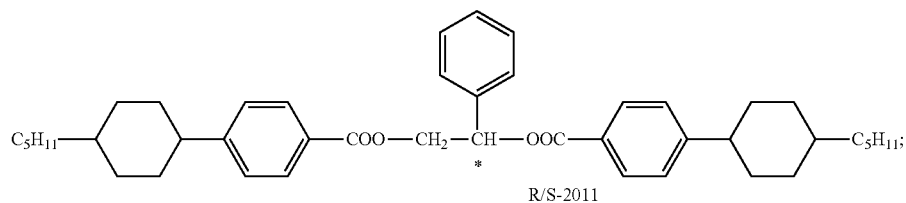

R/S-2011

R/S-3011

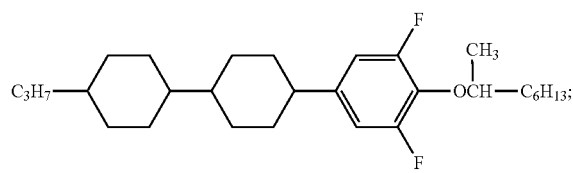

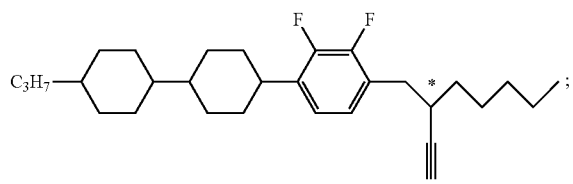

R/S-4011

R/S-5011

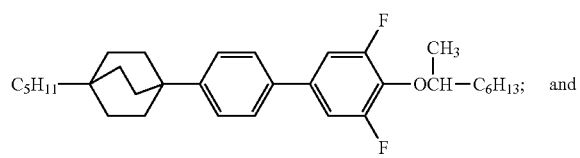  and

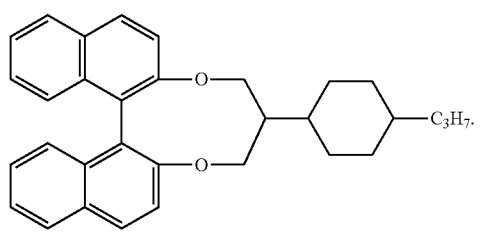

In some embodiments of the present invention, the dopant provides (in percentage by weight) 0%-5% of the liquid crystal composition; preferably, the dopant provides (in percentage by weight) 0.01%-1% of the liquid crystal composition.

Further, additives (such as antioxidant, light stabilizer and the forth) used in the liquid crystal composition of the present invention are preferably selected from the following substances:

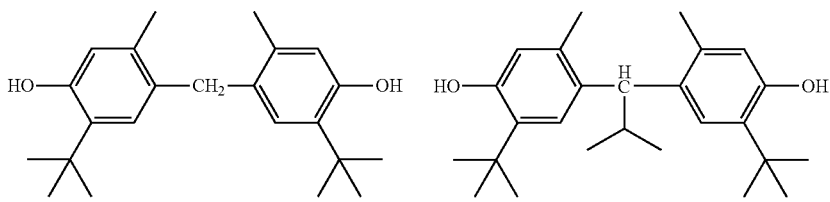

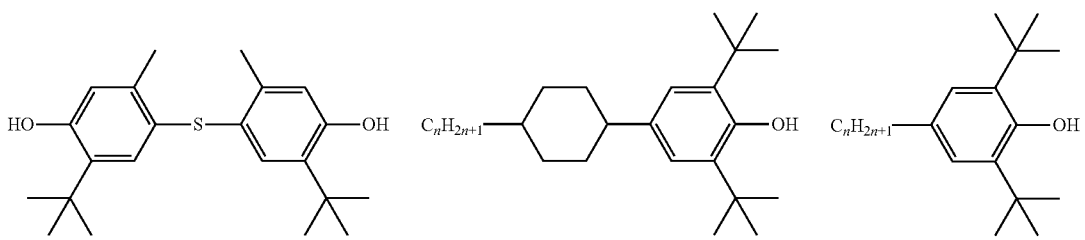

-continued
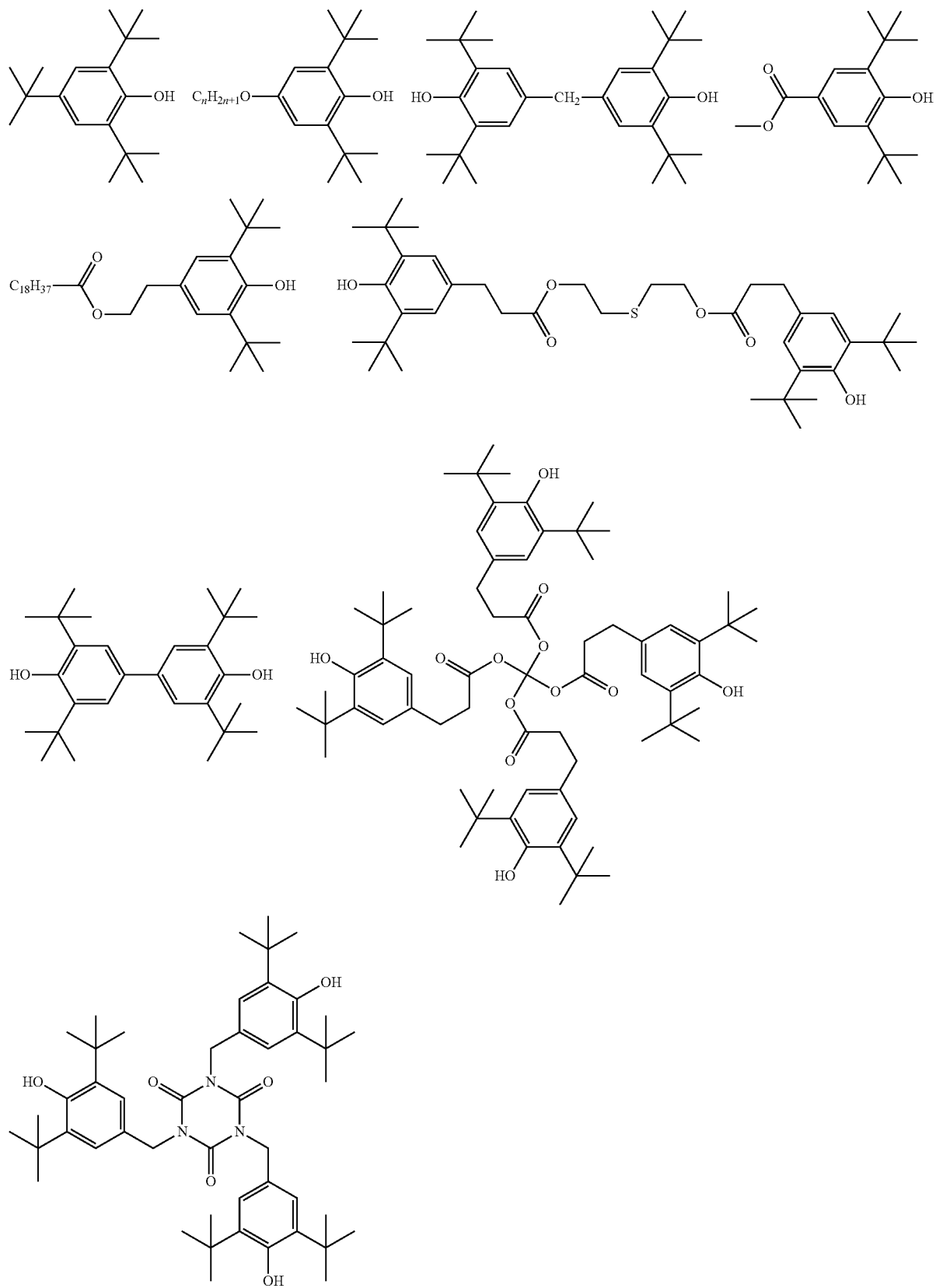

-continued
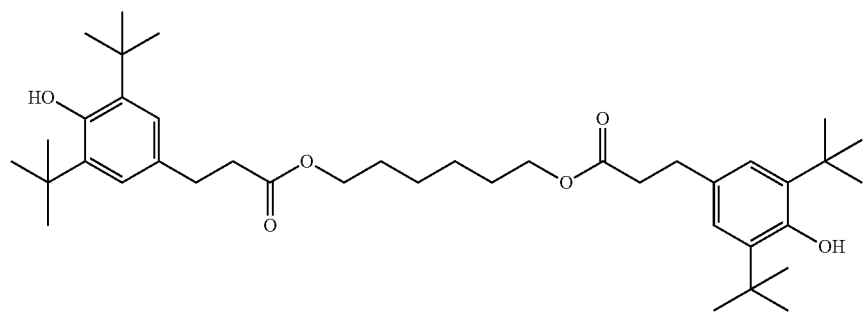
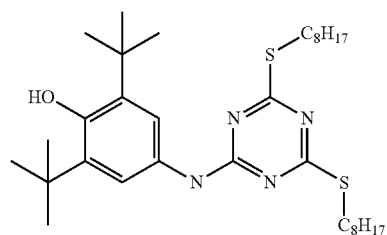
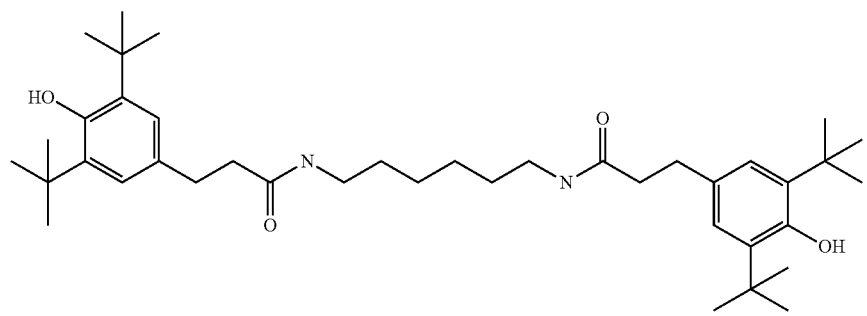
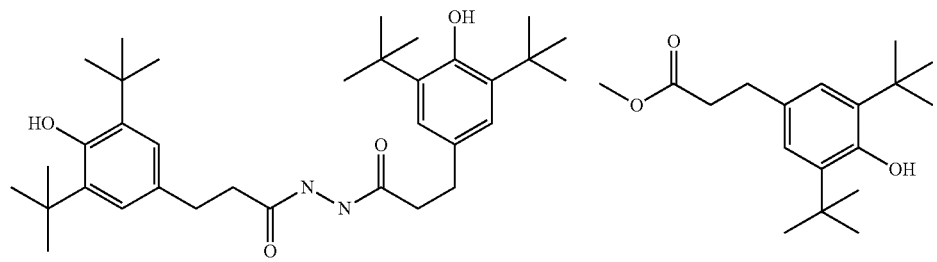
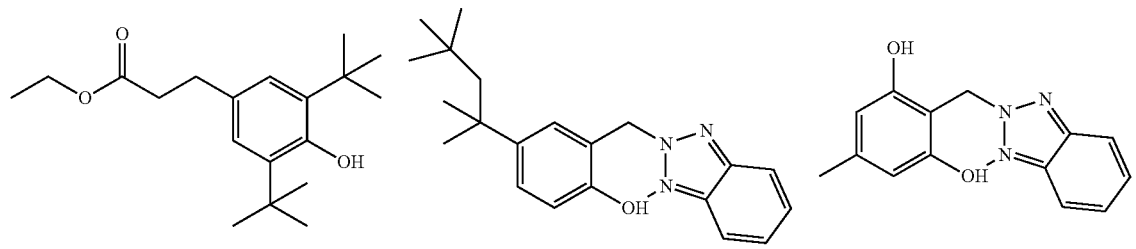

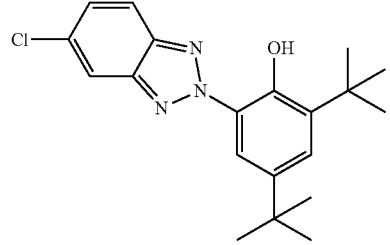
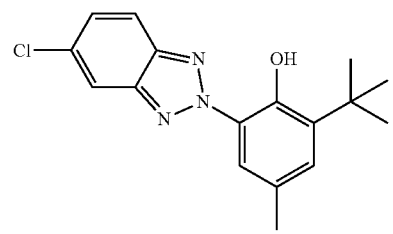
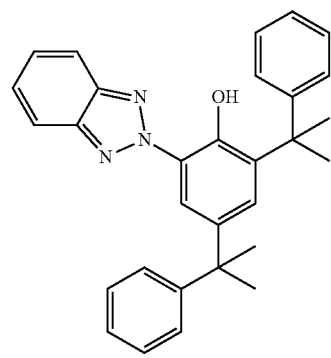
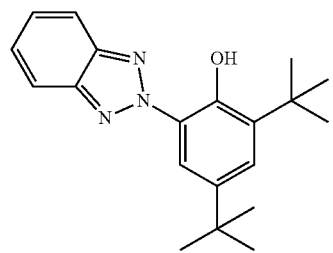
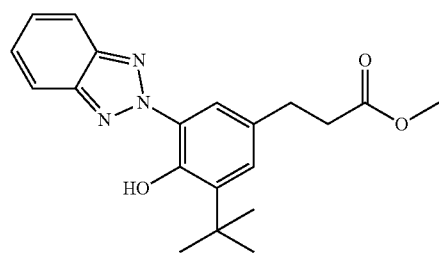
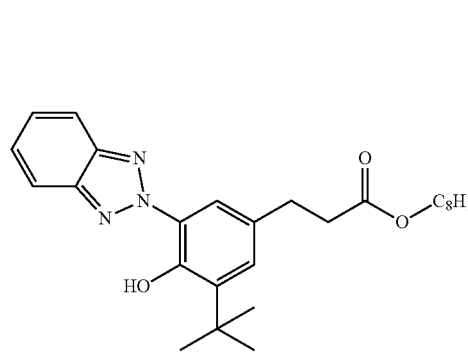
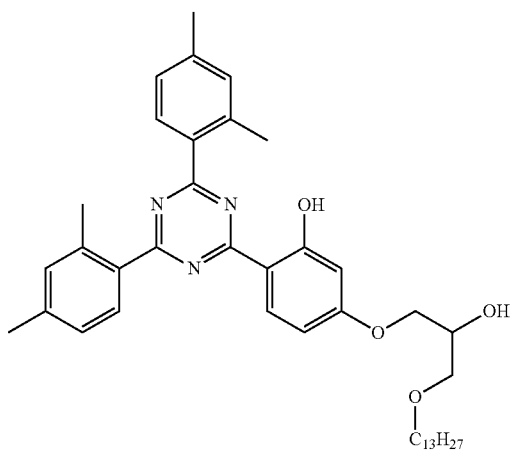
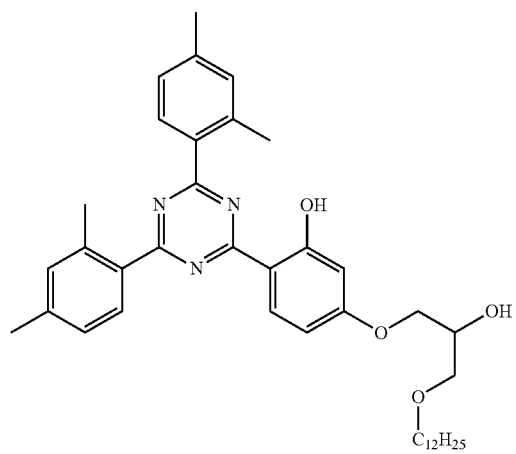
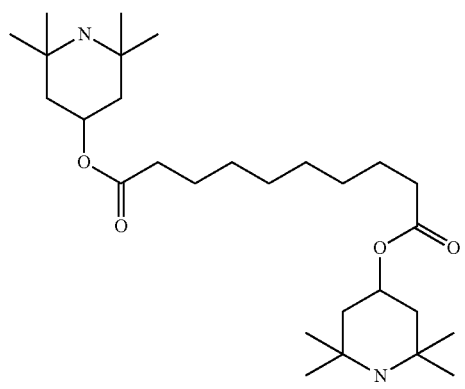

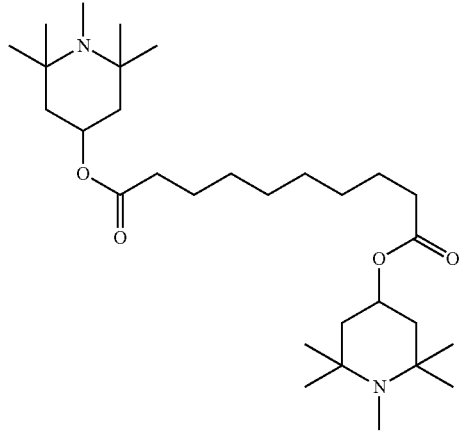

wherein, n represents a positive integer of 1-12.

Preferably, the light stabilizer is selected from the light stabilizers as shown below:

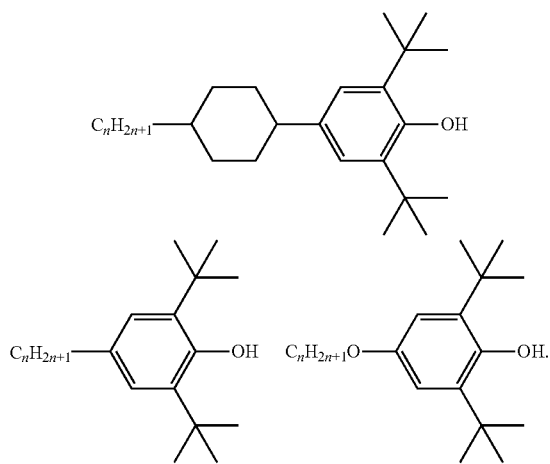

In some embodiments of the present invention, the light stabilizer provides 0%-5% by weight percent of the total weight of the liquid crystal composition; preferably, the light stabilizer provides 0.01%-1% by weight percent of the total weight of the liquid crystal composition; further preferably, the light stabilizer provides 0.01%-0.1% by weight percent of the total weight of the liquid crystal composition.

The liquid crystal composition containing polymerizable compound of the present invention can be polymerized even in the absence of a polymerization initiator. However, polymerization initiator(s) may also be contained therein to promote polymerization. Regarding the polymerization initiators, the following can be listed: benzoin ethers, benzophenones, acetophenones, benzyl ketals, acylphosphine oxides, and the like.

The polymerization of the polymerizable compounds in the liquid crystal composition endows the liquid crystal composition of the present invention with the liquid crystal alignment ability, and the amount of transmitted light in the liquid crystal display device is controlled using the birefringence in the liquid crystal composition.

Preferred polymerization methods for the polymerizable compounds are polymerization with the irradiation of active energy rays, such as ultraviolet rays or electron beams since the polymerization is expected to proceed quickly. In case of ultraviolet ray irradiation, either a polarized light source or an unpolarized light source can be used. In addition, when the polymerization is carried out by sandwiching the liquid crystal composition between two substrates, at least one substrate on the irradiation-receiving side must have an appropriate transparency to the active energy rays. It is also possible to only polymerize a specific region under light irradiation with the aid of mask, and then induce orientation state change of the unpolymerized region upon an external stimulus like the changes in the electric or magnetic field or the temperature. The unpolymerized region is subsequently further polymerized through the initiation of active energy rays. In particular for UV photopolymerization, the polymerizable compounds are preferably polymerized by irradiation with UV light, with a voltage simultaneously being applied to the liquid crystal composition.

The temperature during the irradiation with active energy ray, such as ultraviolet rays and electron beams, is preferably within a temperature range where the liquid crystal compositions of the present invention maintain liquid crystal phase. The polymerization is preferably carried out at a temperature close to room temperature (i.e., 15-35° C.). The ultraviolet ray generation apparatuses for example include metal halide lamp, high-pressure mercury lamp, and super-high-pressure mercury lamp, etc. The wavelength of the ultraviolet rays for irradiation is preferably outside the absorption wavelength ranges of the liquid crystal compositions, and it is preferable to block undesired wavelengths as necessary. The intensity of the ultraviolet rays is preferably 0.1 mW/cm$^2$-50 mW/cm$^2$. However, the intensity of the UV ray is not limited to above and can be changed. Irradiation time of the ultraviolet rays can be properly selected according to its intensity, and is preferably 10-600 seconds.

As used herein, the terms "tilt" and "tilt angle" will be understood to mean a tilted alignment of the liquid crystal molecules relative to the surfaces of the cell in a liquid crystal display device (preferably a PSA liquid crystal display in the present invention). The (pre-)tilt angle here denotes the average angle (<90°) between the longitudinal molecular axes of the liquid crystal molecules (liquid crystal director) and the surface of the outer plates of the liquid crystal cell. A low (pre-)tilt angle value (i.e., a large deviation from 90°) corresponds to a large (pre-)tilt.

The present invention also provides a liquid crystal display device comprising the liquid crystal composition as described above, preferably a PSA liquid crystal display device, more preferably a liquid crystal display device of PS-VA, PS-OCB, PS-IPS, PS-FFS, PS-UB-FFS, PS-positive-VA or PS-TN.

Beneficial Effects

As compared with the prior art, the liquid crystal composition of the present invention has a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, while maintaining appropriate clearing points, optical anisotropy and rotational viscosity, such that the liquid crystal display device containing the liquid crystal composition has a relatively wide temperature usage range, relatively good contrast, and relatively good low-temperature mutual solubility; in addition, the production process of PSA-type liquid crystal displays can be effectively sped up, production efficiency is improved, and at the same time, the problems of "image sticking", uneven display and "broken bright spots" present in existing PSA type liquid crystal displays is effectively improved, and the present invention has a relatively high practical application value.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of each compound in the following Examples are represented by the codes listed in Table 1:

TABLE 1

| Codes of the group structures of the compounds | | |
|---|---|---|
| Unit structure of group | Code | Name of group |
| (cyclohexane ring) | C | 1,4-cyclohexylidene |
| (benzene ring) | P | 1,4-phenylene |
| (fluorobenzene, F up) | G' | 3-fluoro-1,4-phenylene |
| (fluorobenzene, F down) | G | 2-fluoro-1,4-phenylene |

TABLE 1-continued

| Codes of the group structures of the compounds | | |
|---|---|---|
| Unit structure of group | Code | Name of group |
| (difluorobenzene) | W | 2,3-difluoro-1,4-phenylene |
| (tetrahydrofuran-2-yl) | THF | tetrahydrofuran-2-yl |
| (tetrahydrofuran-3-yl) | THF(3) | tetrahydrofuran-3-yl |
| (tetrahydrothiophene-2-yl) | THT | tetrahydrothiophene-2-yl |
| (4,5-dihydrothiophene-2-yl) | DHT(1) | 4,5-dihydrothiophene-2-yl |
| (cyclopentyl) | C(5) | cyclopentyl |
| (difluoro-dibenzofuran) | B(O) | 4,6-difluoro-dibenzo[b,d]furan-3,7-diyl |
| (difluoro-dibenzothiophene) | B(S) | 4,6-difluoro-dibenzo[b,d]thiophene-3,7-diyl |
| —O— | O | oxygen bridge group |
| —CH=CH— or —CH=CH$_2$ | V | ethenyl |
| —CH$_2$O— | 1O | methyleneoxy |
| —C$_n$H$_{2n+1}$ or —C$_n$H$_{2n}$— | n (n represents an integer of 1-12) | alkyl or alkylene |

Take the compound with following structural formula as an example:

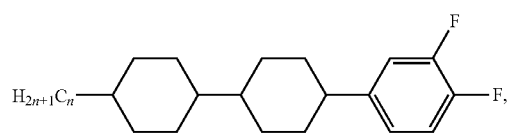

Represented by the codes listed in Table 1, this structural formula can be expressed as nCCGF, in which, n in the code represents the number of the carbon atoms of the alkyl on the left, for example, n is "3", meaning that the alkyl is —C$_3$H$_7$; C in the code represents 1,4-cyclohexylidene, G represents 2-fluoro-1,4-phenylene, and F represents fluoro substituent.

The abbreviated codes of the test items in the following Examples are as follows:

| | |
|---|---|
| Cp | clearing point (nematic-isotropic phases transition temperature, ° C.) |
| Δn | optical anisotropy (589 nm, 25° C.) |
| Δε | dielectric anisotropy (1 KHz, 25° C.) |
| $\gamma_1$ | rotational viscosity (mPa · s, 25° C.) |
| $K_{11}$ | splay elastic constant (25° C.) |
| $K_{33}$ | bend elastic constant (25° C.) |
| $t_{-20°C.}$ | low-temperature storage time at −20° C. (day) |
| Ra | roughness (nm) |
| PTA | pre-tilt angle (°, 25° C.) |
| ΔPTA | stability of pre-tilt angle (change in pre-tilt angle after applying voltage for a fixed time, °) |
| VHR | voltage holding ratio (%) | in which,

Cp: measured with melting point apparatus.

Δn: measured with an Abbe refractometer under sodium lamp (589 nm) light source at 25° C.

Δε=$\varepsilon_{//}$−$\varepsilon_\perp$, in which, $\varepsilon_{//}$ is the dielectric constant parallel to the molecular axis, $\varepsilon_\perp$ is the dielectric constant perpendicular to the molecular axis, the test conditions: 25° C., 1 KHz and VA type test cell (cell gap 6 μm).

γ1: measured using a LCM-2 type liquid crystal physical property evaluation system; the test conditions: 25° C., 160 V-260 V, a test cell having a cell gap of 20 μm.

$K_{11}$ and $K_{33}$: calculated from the measured C-V curve of the liquid crystal material using LCR meter and a VA type test cell, the test conditions: a VA type test cell of 6 μm, V=0.1~20 V.

$t_{-20°C.}$: placing the nematic liquid crystal media in glass vials, storing at −20° C., and recording the time when crystal precipitation is observed.

Ra: after UV photopolymerization of the polymerizable compound contained in the liquid crystal composition, the liquid crystal molecules are rinsed and then the morphological roughness of the polymerized polymer layer is tested with an atomic force microscope (AFM).

PTA: measured by crystal rotation method. Liquid crystals are filled into VA type test cell (cell gap 3.5 μm), and irradiated with ultraviolet light as described in UV1 step with the application of a voltage (15 V, 60 Hz), causing polymerization of the polymerizable compound and generation of pre-tilt angle PTA1, the liquid crystal composition with the generated pre-tilt angle PTA1 are subsequently irradiated with ultraviolet light as described in UV2 step to remove residual polymerizable compounds in the PTA1 state, and at this time the pre-tilt angle formed by the polymerizable compound is PTA2. In the present invention, the polymerization rate of polymerizable compound is investigated through the comparation of the pre-tilt angles formed after the same exposure time of UV1 irradiation (the smaller the pre-tilt angle, the faster the polymerization rate) or the times for forming the same pre-tilt angle (the shorter the time required for forming the same pre-tilt angle, the fast the polymerization rate).

ΔPTA: after the test cell used in the measurement of PTA is subjected to UV1 and UV2 steps to form a pre-tilt angle of 88±0.2°, 60 Hz SW wave, AC voltage (20 V) and DC voltage (2 V) are applied to the test cell at 40° C. with the presence of backlight. After a fixed time period, the pre-tilt angle of the test cell is tested, and ΔPTA (168 h)=PTA (initial)−PTA (168 h), the smaller the ΔPTA (168 h), the better the stability of the pre-tilt angle.

Polymer residue: after applying UV2 for 70 minutes, the liquid crystal eluted from the liquid crystal test cell is detected by high-performance liquid chromatography (HPLC), and the content of polymerizable compounds therein is called polymer residue.

VHR: measured using a TOYO6254 type liquid crystal physical property evaluation system after the application of UV2 for 70 minutes; the test conditions: 60° C., 5 V, 6 Hz, VA type test cell with a cell gap of 3.5 μm.

The components used in the following Examples can either be synthesized by method known in the art or be obtained commercially. These synthetic techniques are conventional, and each of the obtained liquid crystal compounds is tested to meet the standards of electronic compound.

The liquid crystal compositions are prepared in accordance with the ratios specified in the following Examples. The preparation of the liquid crystal compositions is proceeded by mixing in accordance with the ratios through conventional methods in the art, such as heating, ultrasonic wave, suspension and the like.

The structures of the polymerizable compounds used in each of the following Examples are shown in Table 2 below.

TABLE 2

Structure and code for polymerizable compounds

| Component number | structural formula | Formula code |
|---|---|---|
| RM-01 | | |
| RM-02 | | |

TABLE 2-continued

Structure and code for polymerizable compounds

| Component number | structural formula | Formula code |
|---|---|---|
| RM-03 | (structure) | |
| RM-1 | (structure) | I-2 |
| RM-2 | (structure) | I-1 |
| RM-3 | (structure) | I-4 |
| RM-4 | (structure) | I-8 |

Comparative Examples 1-4 and Examples 1-5

The liquid crystal compositions Comparative Host-1, Host-1 and Host-2 are prepared according to each compound and weight percentage listed in Table 3 and are tested by filling the same between two substrates of a liquid crystal display device.

TABLE 3

Formulation and test results for performance parameters of liquid crystal composition

| Component code | Formula code | Weight percentage |||
|---|---|---|---|---|
| | | Comparative Host-1 | Host-1 | Host-2 |
| 3CC2 | M-1 | 20 | 20 | 20 |
| 3PP1 | M-6 | 9 | 9 | 9 |
| 3CPO2 | M-2 | 1 | 1 | 1 |
| 4CC3 | M-1 | 7.5 | 7.5 | 7.5 |
| 2C1OWO2 | N-3 | 2 | 2 | 2 |
| 3C1OWO2 | N-3 | 11.5 | 11.5 | 11.5 |
| 3CCP1 | M-12 | 8 | 8 | 8 |
| 2CPWO2 | N-13 | 8.5 | 8.5 | 8.5 |
| 3CPWO2 | N-13 | 9.5 | 9.5 | 9.5 |
| 3CPWO3 | N-13 | 6 | 6 | 6 |
| 3CC1OWO2 | N-6 | 14 | 14 | 14 |
| 5OB(O)O2 | B-1 | 3 | | |

TABLE 3-continued

Formulation and test results for performance parameters of liquid crystal composition

| Component code | Formula code | Comparative Host-1 | Host-1 | Host-2 |
|---|---|---|---|---|
| C(5)1OB(O)O4 | II-3 | | 3 | |
| THF1OB(S)O4 | II-4 | | | 3 |
| | Total | 100 | 100 | 100 |
| | Cp | 75.9 | 76.2 | 76.5 |
| | $\Delta n$ | 0.101 | 0.102 | 0.103 |
| | $\Delta \varepsilon$ | -3.3 | -3.5 | -3.6 |
| | $K_{11}$ | 15 | 15.2 | 15.4 |
| | $K_{33}$ | 13.9 | 14.3 | 14.7 |
| | $\gamma_1$ | 81 | 78 | 78 |

Polymerizable compounds RM-01, RM-02, RM-03 and RM-1 are added into 100 parts by weight of the liquid crystal composition Comparative Host-1 respectively to form the compositions of Comparative Examples 1-3, and polymerizable compound RM-01 is added into 100 parts by weight of the liquid crystal composition Host-1 to form the composition of Comparative Example 4, polymerizable compounds RM-1 and RM-2 are added into 100 parts by weight of the liquid crystal composition Host-1 respectively to form the compositions of Examples 1-2, and polymerizable compounds RM-1, RM-2, RM-3 and RM-4 are added into 100 parts by weight of the liquid crystal composition Host-2 respectively to form the compositions of Examples 3-5. The specific parts by weight of the polymerizable compounds and the test results of the relevant performances are shown as follows in Table 4.

TABLE 4

Specific parts by weight of the polymerizable compounds and the test results of the relevant performances

| | | Comparative Example 1 | Comparative Example 2 | Comparative Example 3 | Comparative Example 4 |
|---|---|---|---|---|---|
| Types and contents of polymerizable compounds | RM-01 | 0.3 | | | 0.3 |
| | RM-02 | | 0.28 | | |
| | RM-03 | | 0.2 | | |
| | RM-1 | | | 0.3 | |
| | RM-2 | | | | |
| | RM-3 | | | | |
| | RM-4 | | | | |
| Ra (nm) | | 15.8 | 14.7 | 13.6 | 14.8 |
| $t_{-20° C.}$ (day) | | <15 | <15 | <16 | <18 |
| PTA1 (°) formed after UV1 step for different | 60 s | | | | |
| | 70 s | | | 89.02 | |
| | 80 s | 89.52 | 89.44 | 88.26 | 89.03 |
| | 90 s | 88.89 | 88.86 | 87.38 | 88.47 |
| | 100 s | 87.94 | 87.88 | | 87.34 |
| Residual content of polymer after UV2 step | | 185 | 171 | 96 | 147 |
| Pre-tilt angle stability test (°) | PTA | 88.02 | 88.06 | 88.05 | 88.01 |
| | PTA | 87.89 | 87.88 | 87.9 | 87.9 |
| | PTA | 87.81 | 87.76 | 87.78 | 87.81 |
| | PTA | 87.69 | 87.65 | 87.69 | 87.72 |
| | PTA | 87.62 | 87.63 | 87.66 | 87.66 |
| | PTA | 87.6 | 87.62 | 87.63 | 87.62 |
| | $\Delta$PTA | 0.42 | 0.44 | 0.42 | 0.39 |
| VHR (%) after UV2 | | 93.8 | 93.5 | 93.9 | 94 |

| | | Example 1 | Example 2 | Example 3 | Example 4 | Example 5 |
|---|---|---|---|---|---|---|
| Types and contents of polymerizable compounds | RM-01 | | | | | |
| | RM-02 | | | | | |
| | RM-03 | | | | | |
| | RM-1 | 0.3 | | 0.3 | | |
| | RM-2 | | 0.3 | | 0.3 | |
| | RM-3 | | | | | 0.28 |
| | RM-4 | | | | | 0.02 |
| Ra (nm) | | 12.7 | 12.4 | 12.5 | 12.6 | 12.3 |
| $t_{-20° C.}$ (day) | | >20 | >20 | >20 | >20 | >20 |
| PTA1 (°) formed after UV1 step for different | 60 s | 89.05 | 89.45 | 89.33 | 89.26 | 89.42 |
| | 70 s | 88.35 | 88.39 | 88.05 | 88.56 | 88.27 |
| | 80 s | 87.03 | 87.26 | 87.11 | 87.33 | 87.24 |
| | 90 s | | | | | |
| | 100 s | | | | | |
| Residual content of polymer after UV2 step | | 45 | 43 | 45 | 43 | 42 |
| Pre-tilt angle stability test (°) | PTA | 88.03 | 88.01 | 88.03 | 88.04 | 88.01 |
| | PTA | 87.91 | 87.88 | 87.94 | 87.95 | 87.92 |
| | PTA | 87.82 | 87.82 | 87.86 | 87.87 | 87.83 |
| | PTA | 87.74 | 87.77 | 87.78 | 87.8 | 87.75 |
| | PTA | 87.68 | 87.71 | 87.77 | 87.74 | 87.71 |

TABLE 4-continued

Specific parts by weight of the polymerizable compounds
and the test results of the relevant performances

|  | PTA | 87.68 | 87.69 | 87.77 | 87.72 | 87.7 |
|---|---|---|---|---|---|---|
|  | ΔPTA | 0.35 | 0.32 | 0.33 | 0.32 | 0.31 |
| VHR (%) after UV2 |  | 94.3 | 94.6 | 94.8 | 94.6 | 94.7 |

It can be seen from the comparisons between Comparative Examples 1-4 and Examples 1-5 that, the liquid crystal compositions of the present invention have a larger absolute value of dielectric anisotropy, a larger K value, a longer low-temperature storage time period and a lower polymer layer surface roughness, a smaller pre-tilt angle formed within a relatively short time period and a faster speed for forming pre-tilt angle under the action of UV1, a lower polymer residue after UV2 step for 70 min, a higher VHR and a better pre-tilt angle stability, while maintaining appropriate clearing point, optical anisotropy and rotational viscosity.

Comparative Examples 5-8 and Examples 6-10

The liquid crystal compositions Comparative Host-2, Host-3 and Host-4 are prepared according to each compound and weight percentage listed in Table 5 and are tested by filling the same between two substrates of a liquid crystal display device.

TABLE 5

Formulation and test results for performance
parameters of liquid crystal composition

| | | Weight percentage | | |
|---|---|---|---|---|
| Component code | Formula code | Comparative Host-2 | Host-3 | Host-4 |
| 1PWO2 | N-10 | 7.5 | 7.5 | 7.5 |
| 3CCV1 | M-1 | 8 | 8 | 8 |
| 2PWO2 | N-10 | 8 | 8 | 8 |
| 3CPO2 | M-2 | 4.5 | 4.5 | 4.5 |
| 4CC3 | M-1 | 8 | 8 | 8 |
| 4CCV1 | M-1 | 15.5 | 15.5 | 15.5 |
| 3PWO2 | N-10 | 8 | 8 | 8 |
| 5CC3 | M-1 | 7.5 | 7.5 | 7.5 |
| 3CCP1 | M-12 | 9 | 9 | 9 |
| 5OB(O)O2 | B-1 | 4 | | |

TABLE 5-continued

Formulation and test results for performance
parameters of liquid crystal composition

| | | Weight percentage | | |
|---|---|---|---|---|
| Component code | Formula code | Comparative Host-2 | Host-3 | Host-4 |
| 3OB(O)O4 | B-1 | 5 | | |
| THT1OB(O)O4 | II-4 | | 4 | |
| THT1OB(O)O6 | II-4 | | 5 | |
| DHT(1)1OB(O)O4 | II-10 | | | 4 |
| THF(3)1OB(O)O6 | II-5 | | | 5 |
| 3CPWO2 | N-13 | 8 | 8 | 8 |
| 3CCWO2 | N-13 | 7 | 7 | 7 |
| Total | | 100 | 100 | 100 |
| Cp | | 75.4 | 76.9 | 77.3 |
| Δn | | 0.11 | 0.112 | 0.113 |
| Δε | | −3.3 | −3.5 | −3.6 |
| $K_{11}$ | | 14.8 | 15.2 | 15.5 |
| $K_{33}$ | | 15.4 | 16.5 | 16.7 |
| $\gamma_1$ | | 86 | 87 | 89 |

Polymerizable compounds RM-01, RM-02, RM-03 and RM-1 are added into 100 parts by weight of liquid crystal composition Comparative Host-2 respectively to form the compositions of Comparative Examples 5-7, and polymerizable compound RM-01 is added into 100 parts by weight of liquid crystal composition Host-3 to form the composition of Comparative Example 8, polymerizable compounds RM-1 and RM-2 are added into 100 parts by weight of liquid crystal composition Host-3 respectively to form the compositions of Examples 6-7, and polymerizable compounds RM-1, RM-2, RM-3 and RM-4 are added into 100 parts by weight of liquid crystal composition Host-4 respectively to form the compositions of Examples 8-10. The specific parts by weight of the polymerizable compounds and the test results of the relevant performances are shown as follows in Table 6.

TABLE 6

Specific parts by weight of the polymerizable compounds
and the test results of the relevant performances

| | | Comparative Example 5 | Comparative Example 6 | Comparative Example 7 | Comparative Example 8 |
|---|---|---|---|---|---|
| Types and contents of polymerizable compounds | RM-01 | 0.3 | | | 0.3 |
| | RM-02 | | 0.28 | | |
| | RM-03 | | 0.2 | | |
| | RM-1 | | | 0.3 | |
| | RM-2 | | | | |
| | RM-3 | | | | |
| | RM-4 | | | | |
| Ra (nm) | | 15.3 | 15.5 | 13.8 | 14.2 |
| $t_{-20° C.}$ (day) | | <15 | <15 | <16 | <19 |
| PTA1 (°) formed after UV1 step for | | 50 s 60 s 70 s | | | 89.31 |

TABLE 6-continued

Specific parts by weight of the polymerizable compounds and the test results of the relevant performances

| different | 80 s | 89.59 | 89.63 | 88.62 | 89.13 |
|---|---|---|---|---|---|
|  | 90 s | 88.73 | 88.79 | 87.53 | 88.21 |
|  | 100 s | 87.84 | 87.93 |  | 87.29 |
| Residual content of polymer after UV2 step |  | 160 | 153 | 93 | 152 |
| Pre-tilt angle stability test (°) | PTA | 88.03 | 88.06 | 88.03 | 88.01 |
|  | PTA | 87.89 | 87.91 | 87.81 | 87.89 |
|  | PTA | 87.78 | 87.8 | 87.74 | 87.8 |
|  | PTA | 87.69 | 87.72 | 87.68 | 87.71 |
|  | PTA | 87.64 | 87.65 | 87.63 | 87.66 |
|  | PTA | 87.6 | 87.65 | 87.6 | 87.62 |
|  | ΔPTA | 0.43 | 0.41 | 0.43 | 0.39 |
| VHR (%) after UV2 |  | 93.1 | 93.4 | 93.5 | 93.7 |

|  |  | Example 6 | Example 7 | Example 8 | Example 9 | Example 10 |
|---|---|---|---|---|---|---|
| Types and contents of polymerizable compounds | RM-01 |  |  |  |  |  |
|  | RM-02 |  |  |  |  |  |
|  | RM-03 |  |  |  |  |  |
|  | RM-1 | 0.3 |  | 0.3 |  |  |
|  | RM-2 |  | 0.3 |  | 0.3 |  |
|  | RM-3 |  |  |  |  | 0.28 |
|  | RM-4 |  |  |  |  | 0.02 |
| Ra (nm) |  | 12.7 | 12.2 | 12.3 | 12.2 | 12.1 |
| $t_{-20° C.}$ (day) |  | >20 | >20 | >20 | >20 | >20 |
| PTA1 (°) formed after UV1 step for different | 50 s | 89.57 | 89.61 | 89.06 | 89.63 | 89.41 |
|  | 60 s | 88.75 | 88.38 | 88.11 | 88.89 | 88.83 |
|  | 70 s | 87.18 | 87.06 | 86.93 | 87.17 | 87.16 |
|  | 80 s |  |  |  |  |  |
|  | 90 s |  |  |  |  |  |
|  | 100 s |  |  |  |  |  |
| Residual content of polymer after UV2 step |  | 49 | 50 | 49 | 51 | 52 |
| Pre-tilt angle stability test (°) | PTA | 87.98 | 87.95 | 87.98 | 88.01 | 87.97 |
|  | PTA | 87.88 | 87.88 | 87.89 | 87.93 | 87.89 |
|  | PTA | 87.8 | 87.8 | 87.83 | 87.84 | 87.8 |
|  | PTA | 87.74 | 87.75 | 87.76 | 87.76 | 87.71 |
|  | PTA | 87.7 | 87.7 | 87.7 | 87.7 | 87.66 |
|  | PTA | 87.66 | 87.7 | 87.65 | 87.67 | 87.62 |
|  | ΔPTA | 0.32 | 0.35 | 0.33 | 0.34 | 0.35 |
| VHR (%) after UV2 |  | 94.1 | 94 | 94.2 | 94 | 94.1 |

It can be seen from the comparisons between Comparative Examples 5-8 and Examples 6-10 that, the liquid crystal compositions of the present invention have a larger absolute value of dielectric anisotropy, a larger K value, a longer low-temperature storage time period and a lower polymer layer surface roughness, a smaller pre-tilt angle formed within a relatively short time period and a faster speed for forming pre-tilt angle under the action of UV1, a lower polymer residue after UV2 step for 70 min, a higher VHR and a better pre-tilt angle stability, while maintaining appropriate clearing point, optical anisotropy and rotational viscosity.

Example 11

0.6 Part by Weight of Compound SA-2-1

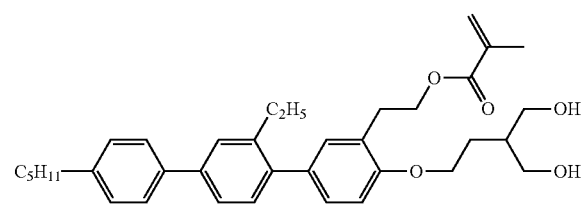

is added into 100 parts by weight of Host-1, and 0.6 part by weight of polymerizable compound RM-1 is added. The resulted liquid crystal composition is filled into "unaligned" test cell (having a cell thickness d of 3.5 μm, ITO coating on both sides (being structured ITO in the case of multi-domain switching), no alignment layer and no passivation layer).

The liquid crystal display forms a spontaneous vertical alignment relative to the surface of the substrate, and the orientation is stable until the clearing point is reached and the resulting VA cell can be inversely switched. A cross polarizer is required to display the switch.

By using additives such as the compound of formula SA-2-1, and based on the combination of Δε<0 and vertical alignment, VA, PM-VA, PVA, MVA, HT-VA, VA-IPS and other similar display technologies eliminate the need for alignment layers (e.g., no PI coating).

Example 12

0.6 Part by Weight of Compound SA-4-1

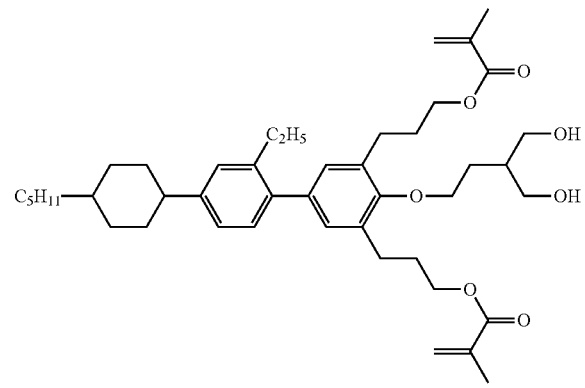

is added into 100 parts by weight of Host-2, and 0.6 part by weight of polymerizable compound RM-2 is added. The resulted liquid crystal composition is filled into "unaligned" test cell (having a cell thickness d of 3.5 µm, ITO coating on both sides (being structured ITO in the case of multi-domain switching), no alignment layer and no passivation layer).

The liquid crystal display forms a spontaneous vertical alignment relative to the surface of the substrate, and the orientation is stable until the clearing point is reached and the resulting VA cell can be inversely switched. A cross polarizer is required to display the switch.

By using additives such as the compound of formula SA-4-1, and based on the combination of $\Delta\epsilon<0$ and vertical alignment, VA, PM-VA, PVA, MVA, HT-VA, VA-IPS and other similar display technologies eliminate the need for alignment layers (e.g., no PI coating).

Example 13

0.5 Part by Weight of Compound SA-4-2

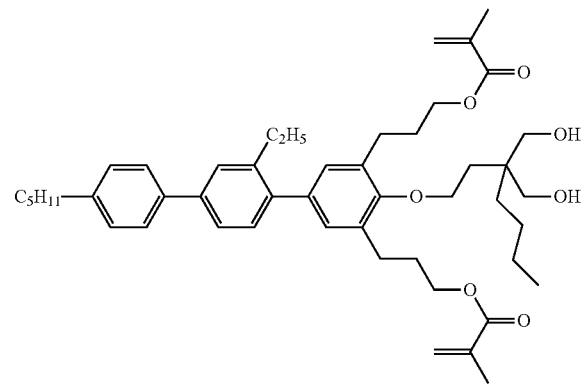

is added into 100 parts by weight of Host-3, and 0.5 part by weight of polymerizable compound RM-3 is added. The resulted liquid crystal composition is filled into "unaligned" test cell (having a cell thickness d of 3.5 µm, ITO coating on both sides (being structured ITO in the case of multi-domain switching), no alignment layer and no passivation layer).

The liquid crystal display forms a spontaneous vertical alignment relative to the surface of the substrate, and the orientation is stable until the clearing point is reached and the resulting VA cell can be inversely switched. A cross polarizer is required to display the switch.

By using additives such as the compound of formula SA-4-2, and based on the combination of $\Delta\epsilon<0$ and vertical alignment, VA, PM-VA, PVA, MVA, HT-VA, VA-IPS and other similar display technologies eliminate the need for alignment layers (e.g., no PI coating).

In conclusion, the liquid crystal composition of the present invention has a relatively large absolute value of dielectric anisotropy, a relatively large K value, a relatively long low-temperature storage time period, a relatively low polymer layer surface roughness, a relatively small pre-tilt angle, a relatively fast speed for forming pre-tilt angle, a relatively low polymer residue, a relatively high VHR and a relatively good pre-tilt angle stability, while maintaining appropriate clearing points, optical anisotropy and rotational viscosity, such that the liquid crystal display device containing the liquid crystal composition has a relatively wide temperature usage range, relatively good contrast, and relatively good low-temperature mutual solubility; in addition, the production process of PSA-type liquid crystal displays can be effectively sped up, production efficiency is improved, and at the same time, the problems of "image sticking", uneven display and "broken bright spots" present in existing PSA type liquid crystal displays is effectively improved, and the present invention has a relatively high practical application value.

The above embodiments are merely illustrative of the technical concepts and the features of the present invention, are included merely for purposes of illustration and implement of the present invention, and are not intended to limit the scope of the present invention. Equivalent variations or modifications are intended to be included within the scope of the present invention.

INDUSTRIAL APPLICABILITY

The liquid crystal composition involved in the present invention can be applied to the field of liquid crystal.

The invention claimed is:
1. A liquid crystal composition comprising:
at least one compound of general formula I:

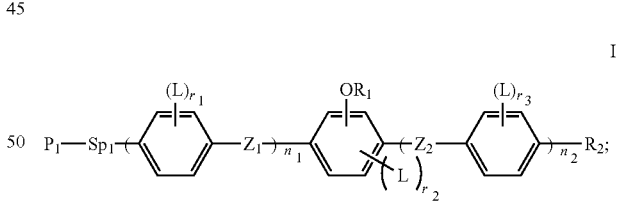

and
at least one compound of general formula II:

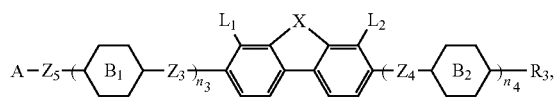

wherein,
$R_1$ represents $C_{1-5}$ linear or $C_{3-5}$ branched, halogenated or unhalogenated alkyl;

R$_2$ represents —H, halogen, —CN, -Sp$_2$-P$_2$ or C$_{1-12}$ linear or C$_{3-12}$ branched alkyl,

wherein one or more than two nonadjacent —CH$_2$— in the C$_{1-12}$ linear or C$_{3-12}$ branched alkyl,

can each be independently replaced by —CH=CH—, —C≡C—, —O—, —CO—, —CO—O— or —O—CO—, one or more —H can each be independently substituted by —F or —Cl;

R$_3$ represents —H, halogen, C$_{1-12}$ linear or C$_{3-12}$ branched alkyl,

wherein one or more than two nonadjacent —CH$_2$— in the C$_{1-12}$ linear or C$_{3-12}$ branched alkyl can each be independently replaced by —CH=CH—, —C≡C—, —O—, —CO—, —CO—O— or —O—CO— in a manner that —O— are not directly connected to each other, and one or more —H on the C$_{1-12}$ linear or C$_{3-12}$ branched alkyl,

can each be independently substituted by —F or —Cl;
ring

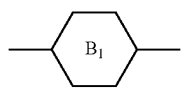

and ring

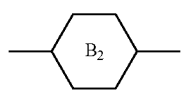

each independently represents

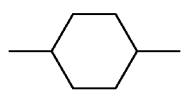

or

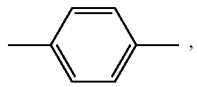

wherein one or more —CH$_2$— in

can be replaced by —O—, and one or more single bond in the ring can be replaced by double bond, wherein one or more —H on

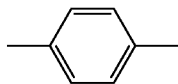

can each be independently substituted by —F, —Cl or —CN, and one or more —CH= in the ring can be replaced by —N=;

A represents

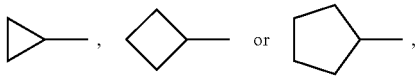

wherein one or more —CH$_2$— n

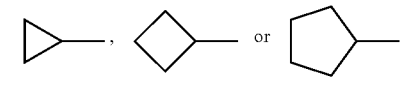

can each be independently replaced by X$^1$ or X$^2$, and one or more single bond in the ring can be replaced by double bond, wherein X$^1$ represents —O— or —S—, X$^2$ represents C$_{1-5}$ linear alkyl;

L each independently represents halogen, —CN or -Sp$_2$-P$_2$;

L$_1$ and L$_2$ each independently represents —H, halogen, C$_{1-3}$ halogenated alkyl or C$_{1-3}$ halogenated alkoxy;

P$_1$ and P$_2$ each independently represents polymerizable group;

Sp$_1$ and Sp$_2$ each independently represents spacer group or single bond;

X represents —CO— or —CF$_2$—;

Z$_1$ and Z$_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH=CH—CO—O—, —O—CO—CH=CH—, —CH$_2$CH$_2$—CO—O—, —O—CO—CH$_2$CH$_2$—, -CR$^1$R$^2$— or single bond; wherein, R$^1$ and R$^2$ each independently represents —H or C$_{1-12}$ linear or C$_{3-12}$ branched alkyl, and n represents an integer of 1-4;

$Z_3$, $Z_4$ and $Z_5$ each independently represents single bond, —CH$_2$CH$_2$—, —CF$_2$CF$_2$—, —CO—O—, —O—CO—, —O—CO—O—, —CH=CH—, —CF=CF—, —CH$_2$O— or —OCH$_2$—;

$r_1$, $r_2$ and $r_3$ each independently represents 0, 1, 2 or 3, when $r_1$, $r_2$ and $r_3$ each independently represents 2 or 3, L can be the same or different;

$n_1$ and $n_2$ each independently represents 0, 1 or 2, and $n_1+n_2 \geq 1$, when $n_1$ represents 2,

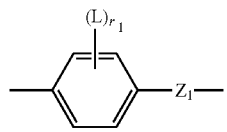

can be the same or different, when $n_2$ represents 2,

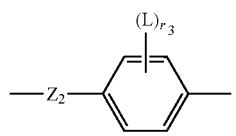

can be the same or different; and $n_3$ represents 0, 1 or 2, $n_4$ represents 0 or 1, when $n_3$ represents 2, ring

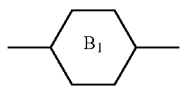

can be the same or different, $Z_3$ can be the same or different.

2. The liquid crystal composition according to claim 1, wherein the compound of general formula II is selected from a group consisting of the following compounds:

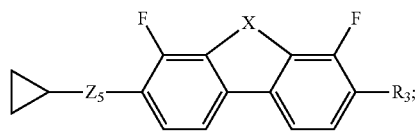
II-1

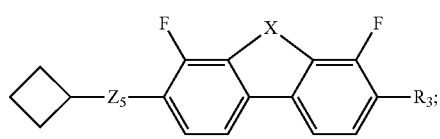
II-2

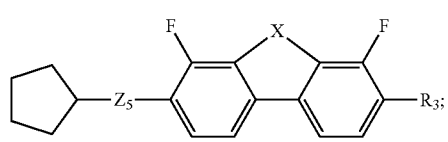
II-3

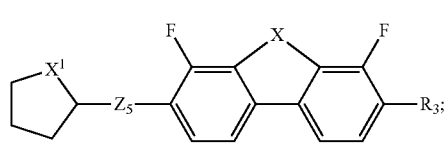
II-4

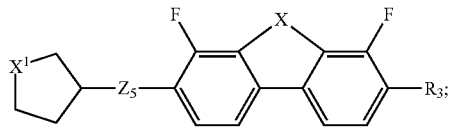
II-5

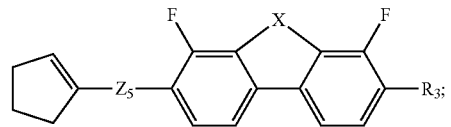
II-6

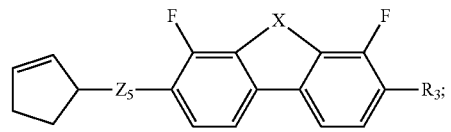
II-7

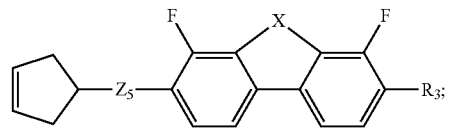
II-8

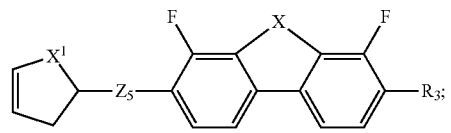
II-9

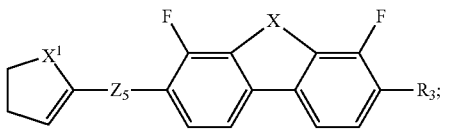
II-10

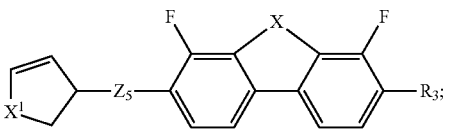
II-11

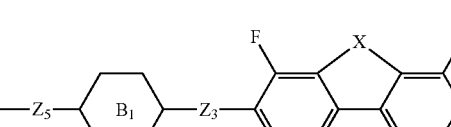
II-12

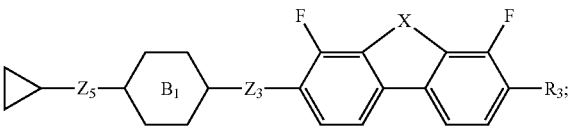
II-13

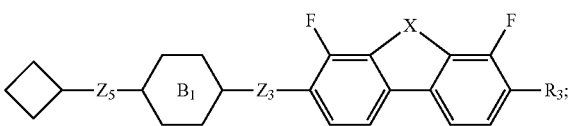
II-14

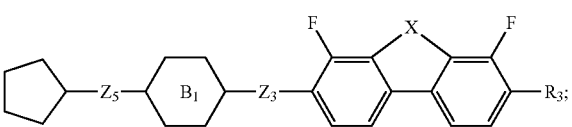
II-15

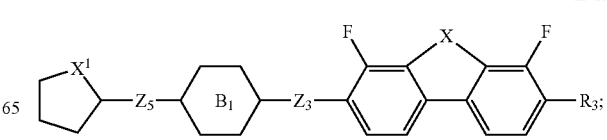

-continued

II-16
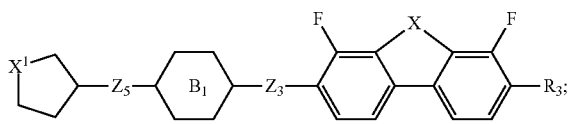

II-17
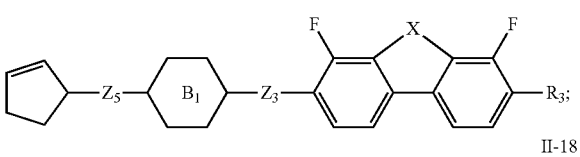

II-18
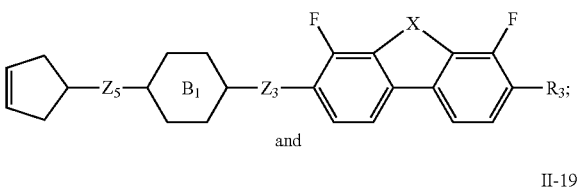
and

II-19
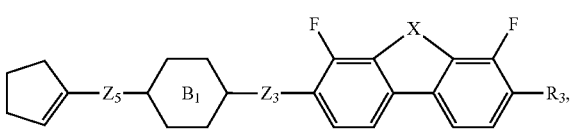

wherein,
R₃ represents —H, halogen, $C_{1-12}$ linear or $C_{3-12}$ branched alkyl,

wherein one or more than two nonadjacent —CH₂— in the $C_{1-12}$ linear or $C_{3-12}$ branched alkyl can each be independently replaced by —CH═CH—, —C≡C—, —O—, —CO—, —CO—O— or —O—CO— in a manner that —O— are not directly connected to each other, and one or more —H on the $C_{1-12}$ linear or $C_{3-12}$ branched alkyl,

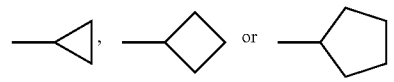

can each be independently substituted by —F or —Cl; ring

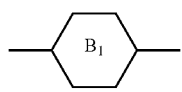

and ring

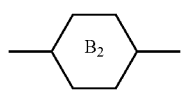

each independently represents

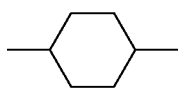

or

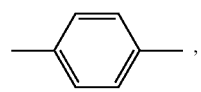, wherein one or more —CH₂— in

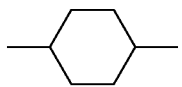

can be replaced by —O—, and one or more single bond in the ring can be replaced by double bond, wherein one or more —H on

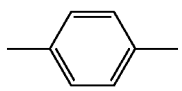

can each be independently substituted by —F, —Cl or —CN, and one or more —CH═ in the ring can be replaced by —N═;
X represents —CO— or —CF₂—; and
Z₃ and Z₅ each independently represents single bond, —CH₂CH₂—, —CF₂CF₂—, —CO—O—, —O—CO—, —O—CO—O—, —CH═CH—, —CF═CF—, —CH₂O— or —OCH₂—.

3. The liquid crystal composition according to claim 1, wherein the liquid crystal composition further comprises at least one compound of general formula M:

M

wherein,
$R_{M1}$ and $R_{M2}$ each independently represents $C_{1-12}$ linear or $C_{3-12}$ branched alkyl, wherein one or more than two nonadjacent —CH₂— in the $C_{1-12}$ linear or $C_{3-12}$ branched alkyl can each be independently replaced by —CH═CH—, —C≡C—, —O—, —CO—, —CO—O— or —O—CO—;

ring

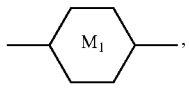, ring

and ring

each independently represents

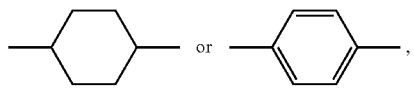, wherein one or more —CH₂— in

can be replaced by —O—, and one or more single bond in the ring can be replaced by double bond, and wherein at most one —H on

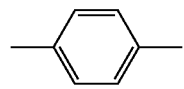

can be substituted by halogen;

$Z_{M1}$ and $Z_{M2}$ each independently represents single bond, —CO—O—, —O—CO—, —CH₂O—, —OCH₂—, —C≡C—, —CH=CH—, —CH₂CH₂— or —(CH₂)₄—; and nm represents 0, 1 or 2, wherein when $n_M$=2, ring

can be the same or different, $Z_{M2}$ can be the same or different.

4. The liquid crystal composition according to claim 1, wherein the liquid crystal composition further comprises at least one compound of general formula N:

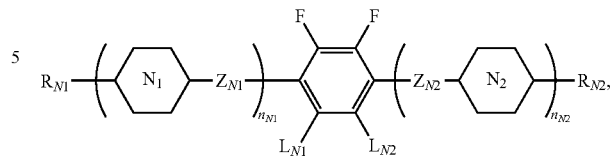

wherein, $R_{N1}$ and $R_{N2}$ each independently represents $C_{1-12}$ linear or $C_{3-12}$ branched alkyl,

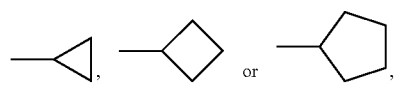

wherein one or more than two nonadjacent —CH₂— in the $C_{1-12}$ linear or $C_{3-12}$ branched alkyl can each be independently replaced by —CH=CH—, —C≡C—, —O—, —CO—, —CO—O— or —O—CO—;

ring

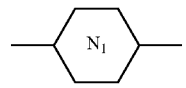

and ring

each independently represents

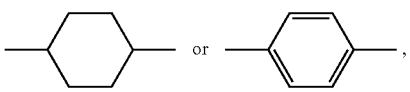, wherein one or more —CH₂— in

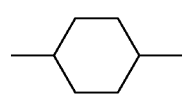

can be replaced by —O—, and one or more single bond in the ring can be replaced by double bond, wherein one or more —H on

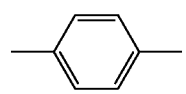

can each be independently substituted by —F, —Cl or —CN, and one or more —CH= in the ring can be replaced by —N=;

$Z_{N1}$ and $Z_{N2}$ each independently represents single bond, —CO—O—, —O—CO—, —CH₂O—, —OCH₂—, —CH=CH—, —C≡C—, —CH$_2$CH$_2$—, —CF$_2$CF$_2$—, —(CH$_2$)$_4$—, —CF$_2$O— or —OCF$_2$—;

L$_{N1}$ and L$_{N2}$ each independently represents —H, C$_{1-3}$ alkyl or halogen; and n$_{N1}$ represents 0, 1, 2 or 3, n$_{N2}$ represents 0 or 1, and 0≤n$_{N1}$+n$_{N2}$≤3, wherein when n$_{N1}$=2 or 3, ring

can be the same or different, Z$_{N1}$ can be the same or different.

5. The liquid crystal composition according to claim 1, wherein the liquid crystal composition further comprises at least one self-alignment agent of general formula SA:

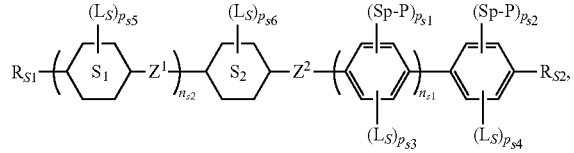

SA wherein,

R$_{S1}$ represents Sp-P, C$_{1-12}$ linear or C$_{3-12}$ branched alkyl,

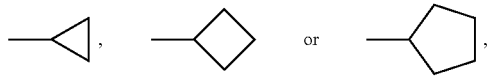

wherein one or more than two nonadjacent —CH$_2$— in the C$_{1-12}$ linear or C$_{3-12}$ branched alkyl can each be independently replaced by —CH=CH—, —C≡C—, —O—, —CO—, —CO—O— or —O—CO—, and one or more —H on the C$_{1-12}$ linear or C$_{3-12}$ branched alkyl,

can each be independently substituted by —F or —Cl;

R$_{S2}$ represents anchoring group:

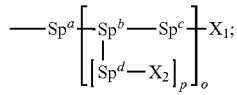

p represents 1 or 2, when p represents 2, -Sp$^d$-X$_2$ can be the same or different;

o represents 0 or 1;

X$_1$ and X$_2$ each independently represents —H, —OH, —SH, —NH$_2$, —NHR$^{11}$, —NR$^{11}$$_2$, NHC(O)—R$^{11}$, —OR$^{11}$, —C(O)OH, —CHO or C$_{1-12}$ linear or C$_{3-12}$ branched, halogenated or unhalogenated alkyl; wherein, at least one of X$_1$ and X$_2$ is selected from —OH, —SH, —NH$_2$, —NHR$^{11}$, —C(O)OH or —CHO;

Sp$^a$, Sp$^c$ and Sp$^d$ each independently represents spacer group or single bond;

Sp$^b$ each independently represents

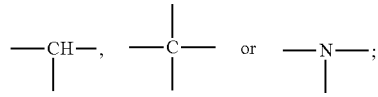

ring

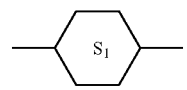

and ring

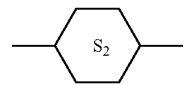

each independently represents

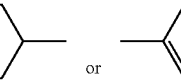

wherein one or more —CH$_2$— in

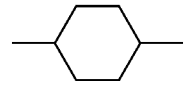

can be replaced by —O—, and one or more single bond in the ring can be replaced by double bond;

Ls each independently represents —F, —Cl, —CN, —NO$_2$, —NCO, —NCS, —OCN, —SCN, —C(O)N (R$^0$)$_2$, —C(O)R$^0$, C$_{1-12}$ linear or C$_{3-12}$ branched alkyl,

wherein one or more than two nonadjacent —CH$_2$— in the C$_{1-12}$ linear or C$_{3-12}$ branched alkyl can each be independently replaced by —CH=CH—, —C≡C—, —O—, —CO—, —CO—O— or —O—CO—, and one or more —H on the C$_{1-12}$ linear or C$_{3-12}$ branched alkyl,

can each be independently substituted by —F;

R$^0$ and R$^{11}$ each independently represents C$_{1-12}$ linear or C$_{3-12}$ branched alkyl;

P represents polymerizable group;

Sp represents spacer group or single bond;
$n_{s1}$ represents 0 or 1;
$n_{s2}$ represents 0, 1, 2 or 3, when $n_{s2}$ represents 2 or 3,

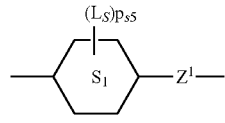

can be the same or different;

$p_{s1}$, $p_{s2}$, $p_{s3}$ and $p_{s4}$ each independently represents 0, 1 or 2, wherein $1 \leq p_{s1}+p_{s2} \leq 2$;

$p_{s5}$ and $p_{s6}$ each independently represents 0 or 1; and $Z_1$ and $Z_2$ each independently represents —O—, —S—, —CO—, —CO—O—, —O—CO—, —O—CO—O—, —CH$_2$O—, —OCH$_2$—, —CH$_2$S—, —SCH$_2$—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH—CH=CO—O—, —O—CO—CH=CH—, —CH$_2$CH$_2$—CO—O—, —O—CO—CH$_2$CH$_2$—, —CR$^1$R$^2$— or single bond, wherein, R$^1$ and R$^2$ each independently represents —H or C$_{1-12}$ linear or C$_{3-12}$ branched alkyl, and n represents an integer of 1-4.

* * * * *